US011467680B2

(12) United States Patent
Jeon et al.

(10) Patent No.: US 11,467,680 B2
(45) Date of Patent: Oct. 11, 2022

(54) ELECTRONIC APPARATUS EMPLOYING FULL FRONT SCREEN

(71) Applicant: Samsung Electronics Co., Ltd., Suwon-si (KR)

(72) Inventors: Yong Joon Jeon, Hwaseong-si (KR); Geon Soo Kim, Suwon-si (KR); Hyung Sup Byeon, Suwon-si (KR); Doo Suk Kang, Suwon-si (KR); Han Vit Kang, Suwon-si (KR); Yo Han Lee, Seongnam-si (KR); Bo Kun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 838 days.

(21) Appl. No.: 16/322,847

(22) PCT Filed: Aug. 1, 2017

(86) PCT No.: PCT/KR2017/008278
§ 371 (c)(1),
(2) Date: Feb. 1, 2019

(87) PCT Pub. No.: WO2018/026163
PCT Pub. Date: Feb. 8, 2018

(65) Prior Publication Data
US 2021/0382570 A1 Dec. 9, 2021

(30) Foreign Application Priority Data
Aug. 2, 2016 (KR) .................. 10-2016-0098297

(51) Int. Cl.
*G06F 3/041* (2006.01)
*G06F 3/044* (2006.01)
(Continued)

(52) U.S. Cl.
CPC ............. *G06F 3/041* (2013.01); *G06F 3/044* (2013.01); *G06F 3/0445* (2019.05);
(Continued)

(58) Field of Classification Search
CPC ........ G06F 3/0445; G06F 3/044; G06F 3/041; G06F 3/04817; G06F 3/04842;
(Continued)

(56) References Cited

U.S. PATENT DOCUMENTS 9,557,844 B2   1/2017  Lee et al.
9,933,936 B2   4/2018  Lee et al.
(Continued)

FOREIGN PATENT DOCUMENTS

CN   104881196 A   9/2015
CN   105159506 A   12/2015
(Continued)

OTHER PUBLICATIONS

Partial Supplementary European Search Report dated Jun. 19, 2019 issued in European Application No. 17837214.0.
(Continued)

*Primary Examiner* — Yaron Cohen
(74) *Attorney, Agent, or Firm* — Jefferson IP Law, LLP

(57) ABSTRACT

An electronic device according to an embodiment includes a printed circuit board, a bracket, a pressure sensor, a touch screen display, a cover glass, a touch sensor, and a fingerprint sensor. Besides, it may be permissible to prepare various other embodiments speculated through the specification.

8 Claims, 32 Drawing Sheets

(51) Int. Cl.
    *G06F 3/04817*     (2022.01)
    *G06F 3/04842*     (2022.01)
    *G06F 3/04886*     (2022.01)
    *G06V 40/13*     (2022.01)
    *G06F 1/16*     (2006.01)
    *G06F 1/18*     (2006.01)

(52) U.S. Cl.
    CPC ...... *G06F 3/04817* (2013.01); *G06F 3/04842* (2013.01); *G06F 3/04886* (2013.01); *G06V 40/1306* (2022.01); *G06V 40/1318* (2022.01); *G06F 1/1637* (2013.01); *G06F 1/181* (2013.01); *G06F 2203/04105* (2013.01)

(58) Field of Classification Search
    CPC .... G06F 3/0488; G06F 3/04886; G06F 1/181; G06F 2203/04105; G06F 1/1637; G06K 9/00; G06K 9/0004; G06K 9/0002
    See application file for complete search history.

(56) References Cited

U.S. PATENT DOCUMENTS

| | | | |
|---|---|---|---|
| 9,939,951 | B2 | 4/2018 | Luo et al. |
| 10,185,440 | B2 | 1/2019 | Luo et al. |
| 2014/0260690 | A1* | 9/2014 | Corder ................ G01L 9/0072 73/862.626 |
| 2014/0362014 | A1 | 12/2014 | Ullrich et al. |
| 2015/0124367 | A1* | 5/2015 | Kim .................... H01F 7/1844 361/142 |
| 2015/0145796 | A1 | 5/2015 | Lee et al. |
| 2015/0177884 | A1 | 6/2015 | Han |
| 2015/0293623 | A1 | 10/2015 | Kim et al. |
| 2016/0018942 | A1 | 1/2016 | Kang et al. |
| 2016/0131908 | A1 | 5/2016 | Fateh |
| 2016/0133055 | A1 | 5/2016 | Fateh |
| 2016/0162093 | A1 | 6/2016 | Kim et al. |
| 2016/0196463 | A1 | 7/2016 | Jiang et al. |
| 2016/0274728 | A1 | 9/2016 | Luo et al. |
| 2017/0115876 | A1 | 4/2017 | Lee et al. |
| 2017/0147850 | A1 | 5/2017 | Liu et al. |
| 2017/0329953 | A1* | 11/2017 | Defazio ................ G06F 3/0488 |
| 2017/0336861 | A1 | 11/2017 | Fateh |
| 2018/0188811 | A1 | 7/2018 | Ullrich et al. |
| 2018/0188885 | A1 | 7/2018 | Luo et al. |
| 2019/0018490 | A1 | 1/2019 | Ullrich et al. |

FOREIGN PATENT DOCUMENTS

| | | |
|---|---|---|
| EP | 3 043 236 A1 | 7/2016 |
| KR | 10-2015-0029127 A | 3/2015 |
| KR | 10-2015-0061336 A | 6/2015 |
| KR | 10-2015-0068330 A | 6/2015 |
| KR | 10-2015-0072923 A | 6/2015 |
| KR | 10-2015-0073539 A | 7/2015 |
| KR | 10-2015-0108409 A | 9/2015 |
| KR | 10-2015-0117120 A | 10/2015 |
| KR | 10-2016-0071264 A | 6/2016 |
| WO | 2016/089186 A1 | 6/2016 |

OTHER PUBLICATIONS

Extended European Search Report dated Oct. 7, 2019, issued in European Application No. 17837214.0.

* cited by examiner

ELECTRONIC APPARATUS EMPLOYING FULL FRONT SCREEN

TECHNICAL FIELD

The present disclosure relates to an electronic device in a full front screen form with a soft key function.

BACKGROUND ART

Electronic devices equipped with screens, such as smartphones, wearable devices, and the like, have been widely used with the development of mobile communication technologies. These electronic devices may execute various functions, such as taking a photo or a video, playing a music file or a video file, playing a game, doing a search on the Internet, and the like, through the screens.

An electronic device may include a touch screen display and soft keys such as a home key, a menu key, and a back key. The touch screen display may output an application execution screen. The soft keys may be arranged on a lower side of the touch screen display on the front surface of the electronic device.

DISCLOSURE

Technical Problem

In the case where the touch screen display and the soft keys are disposed together on the front surface of the electronic device, the size of the touch screen display cannot help but be reduced. An electronic device in a full front screen form without soft keys may be considered to meet user demands for a larger touch screen display.

However, since the electronic device in a full front screen form does not include soft keys, it needs to secure a structure to replace the soft keys. Furthermore, it is necessary to provide a user with continuous usability from an existing terminal, by offering functions that are the same as, or similar to, the soft keys.

Aspects of the present disclosure are to address at least the above-mentioned problems and/or disadvantages and to provide at least the advantages described below. Accordingly, an aspect of the present disclosure is to provide an electronic device for solving the above-mentioned problems and disadvantages.

Technical Solution

In accordance with an aspect of the present disclosure, an electronic device includes a printed circuit board, a bracket disposed over the printed circuit board, a pressure sensor electrically coupled to the printed circuit board and disposed in a partial area of the bracket, a touch screen display electrically coupled to the printed circuit board and disposed over the bracket, a cover glass disposed over the touch screen display, a touch sensor that is disposed between the cover glass and the touch screen display and that detects whether an external object present outside the electronic device makes contact with the cover glass, and a fingerprint sensor that detects a fingerprint of the external object.

In accordance with another aspect of the present disclosure, an electronic device includes a housing including an outer surface, a touch screen display exposed through at least a portion of the outer surface of the housing, a pressure sensor that detects pressure exerted on the at least a portion of the outer surface of the housing by an external object, a wireless communication circuit located inside the housing, at least one processor electrically coupled with the touch screen display, the pressure sensor, and the wireless communication circuit, and a memory electrically coupled to the processor. The memory includes instructions that, when executed, cause the processor to display a user interface including an object that at least partly overlaps an area on the touch screen display, detect contact with the object by using the touch screen display, detect pressure applied to the area by using the pressure sensor, and perform a first function associated with the object or a second function associated with the electronic device, based on at least part of the detected contact and the detected pressure.

In accordance with another aspect of the present disclosure, an electronic device includes a housing including a first surface facing a first direction and a second surface facing a second direction opposite to the first direction, the first surface including a first periphery, a touch screen display located between the first surface and the second surface and exposed through the first surface, the touch screen display including a first side extending along the first periphery of the first surface, a pressure sensor that is located between the first surface and the second surface and that detects pressure exerted on the touch screen display by an external object, a wireless communication circuit located inside the housing, at least one processor electrically coupled with the touch screen display, the pressure sensor, and the wireless communication circuit, and a memory electrically coupled to the processor. The memory includes instructions that, when executed, cause the processor to display a user interface including a keypad on the touch screen display, the keypad being spaced apart from or located in proximity to the first side of the touch screen display without substantial spacing there between, detect pressure applied to a selected area on the keypad by using the pressure sensor, display a button that is not part of the keypad, in the selected area on the touch screen display based on at least part of the detected pressure while displaying at least a portion of the keypad, and execute a function associated with the button, based on at least part of the detected pressure.

Advantageous Effects

According to the embodiments of the present disclosure, the pressure sensor and the fingerprint sensor may be disposed in the soft key area to provide a function similar to a soft key on a full front screen.

Furthermore, even though the touch screen display and the soft key area overlap each other, an input signal for an object (e.g., an application) that is disposed in the overlapping area may be processed according to a user's intent.

In addition, the present disclosure may provide various effects that are directly or indirectly recognized.

MODE FOR INVENTION

Figure 1:
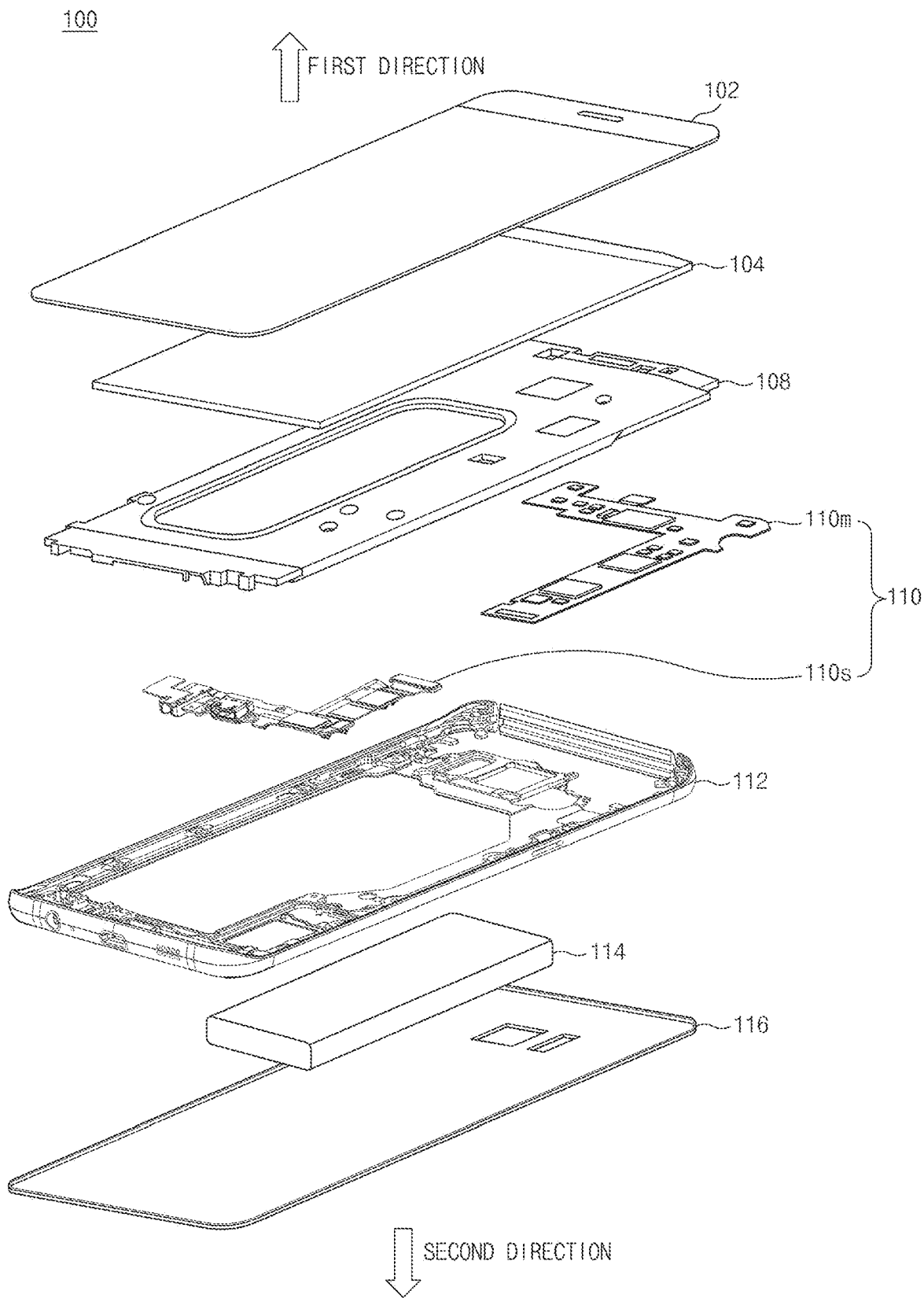
FIG. 1 is an exploded perspective view illustrating an electronic device according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

FIG. 1 is an exploded perspective view illustrating an electronic device according to an embodiment.

Referring to FIG. 1, the electronic device 100 according to the embodiment may include a cover glass 102, a touch screen display 104, a flexible printed circuit board (FPCB), a bracket 108, a printed circuit board (PCB) 110, a rear housing 112, a battery 114, and a back cover 116. According to various embodiments, the electronic device 100 may not include some of the components illustrated in FIG. 1 and may additionally include components not illustrated in FIG. 1.

The cover glass 102 may transmit light generated by the touch screen display 104. Furthermore, a user may perform a touch (including contact using an electronic pen) by bringing a part (e.g., a finger) of the user's body into contact with the cover glass 102. The cover glass 102 may be formed of, for example, reinforced glass, reinforced plastic, or a flexible polymer material. The cover glass 102 may protect the touch screen display 104 and the components included in the electronic device 100 from an external impact. According to various embodiments, the cover glass 102 may also be referred to as a glass window.

The touch screen display 104 may be disposed under the cover glass 102 and over the bracket 108. Furthermore, the touch screen display 104 may be electrically coupled with the PCB 110 and may output contents (e.g., text, images, videos, icons, widgets, or symbols). The touch screen display 104 may receive a touch input (e.g., a touch, a gesture, hovering, or a "force touch") from the user. The touch screen display 104 may have, on a rear surface thereof, a thin film sheet or a plate that is made of copper (Cu) or graphite.

According to an embodiment, the touch screen display 104 may include a liquid crystal display (LCD) panel, a light emitting diode (LED) display panel, an organic light emitting diode (OLED) display panel, a microelectromechanical systems (MEMS) display panel, or an electronic paper display panel.

The FPCB may include a wiring structure for electrically coupling the PCB 110 to a pressure sensor and the touch screen display 104. According to an embodiment, at least part of the wiring structure may be implemented on the FPCB.

The bracket 108 may be formed of, for example, a magnesium alloy and may be disposed over the PCB 110. The bracket 108 may be combined with the touch screen display 104 and the PCB 110 to physically support the touch screen display 104 and the PCB 110. According to an embodiment, the bracket 108 may have a through-hole through which part of the FPCB passes. Furthermore, according to an embodiment, the bracket 108 may have a swelling gap formed therein in consideration of swelling of the battery 114 according to a secular change. According to various embodiments, the through-hole may be referred to as various terms such as a via-hole, an opening, and an opening part.

The PCB 110 may include, for example, a first PCB (or a main PCB) 110m and a second PCB (or a sub-PCB) 110s. According to an embodiment, the first PCB 110m and the second PCB 110*s* may be disposed below the bracket 108 and may be electrically coupled together through a specified connector or specified wiring. The PCBs 110*m* and 110*s* may be implemented with, for example, a rigid printed circuit board (rigid PCB). According to an embodiment, various types of electronic parts, elements, and printed circuits of the electronic device 100 may be mounted or arranged on the PCBs 110*m* and 110*s*. The PCBs 110*m* and 110*s* may be referred to as a main board, a printed board assembly (PBA), or simply a PCB.

The rear housing 112 may be disposed under the PCB 110 and may accommodate the components of the electronic device 100. The rear housing 112 may form the interior and/or the appearance of the electronic device 100. The rear housing 112 may also be referred to as a rear case or a rear plate. The rear housing 112 may include an area not exposed outside the electronic device 100 and an area exposed through an outer side of the electronic device 100. For example, the area not exposed outside the electronic device 100 may be formed of an injection-molded plastic material. The area exposed through the outer side of the electronic device 100 may be formed of metal. The exposed side area, which is formed of metal, may also be referred to as a metal bezel. According to an embodiment, at least part of the metal bezel may be utilized as an antenna radiator for transmitting and receiving signals of a specified frequency.

The battery 114 may bilaterally convert between chemical energy and electrical energy. For example, the battery 114 may convert chemical energy to electrical energy. The battery 114 may supply the electrical energy to the touch screen display 104 and various components or modules mounted on the PCB 110. Alternatively, the battery 114 may convert electrical energy supplied from the outside to chemical energy and may store the chemical energy. According to an embodiment, the PCB 110 may include a power management module for managing charge/discharge of the battery 114.

The back cover 116 may be attached to a rear surface of the electronic device 100 (that is, the bottom of the rear housing 112). The back cover 116 may be formed of reinforced glass, an injection-molded plastic material, and/or metal. According to various embodiments, the back cover 116 may be implemented integrally with the rear housing 112 or may be implemented so as to be detachable by the user.

Figure 2A:
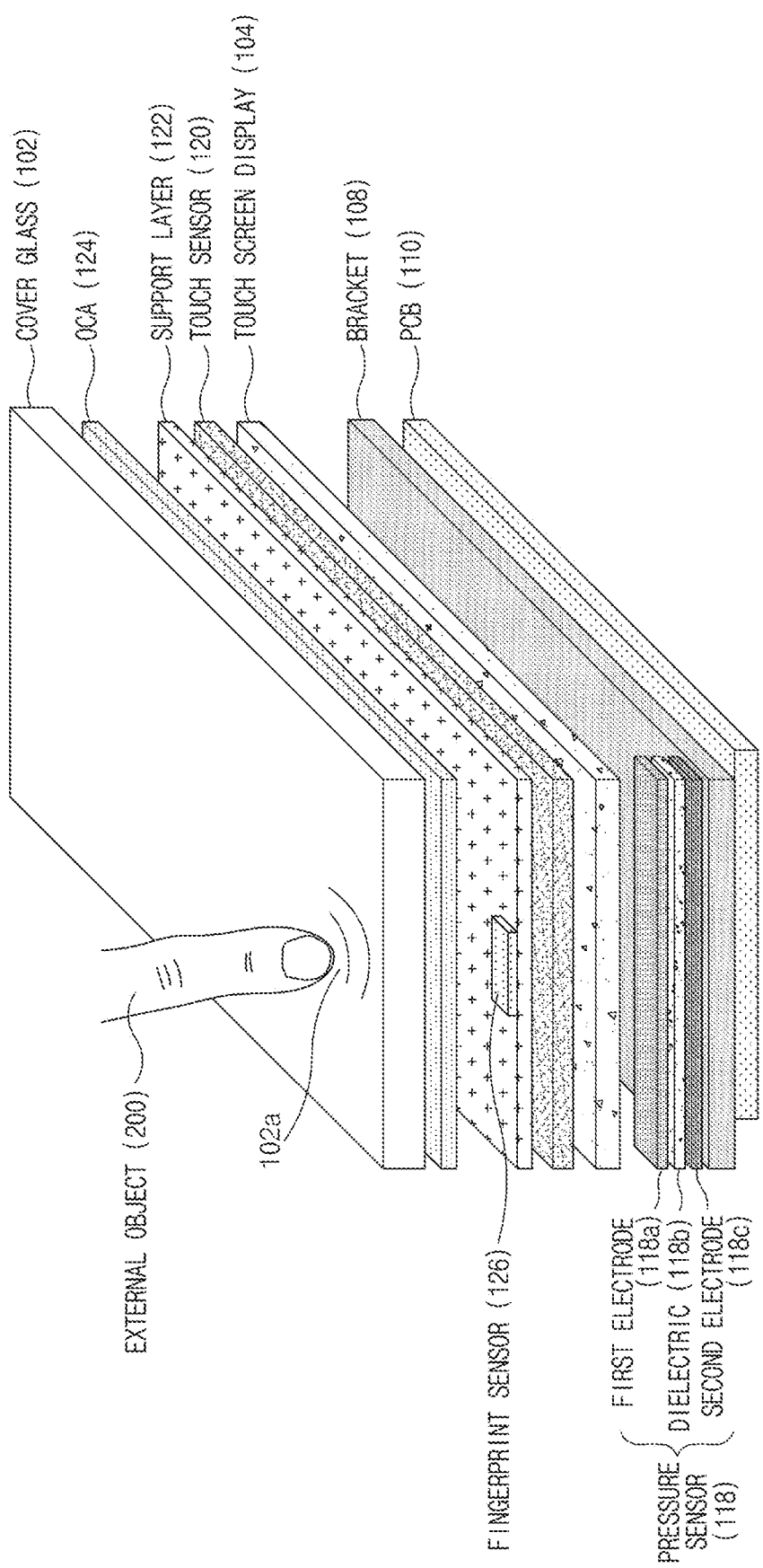
FIG. 2A is a view illustrating a stack structure of the electronic device in which a fingerprint sensor is present above a pressure sensor, according to an embodiment.
Figure 2B:
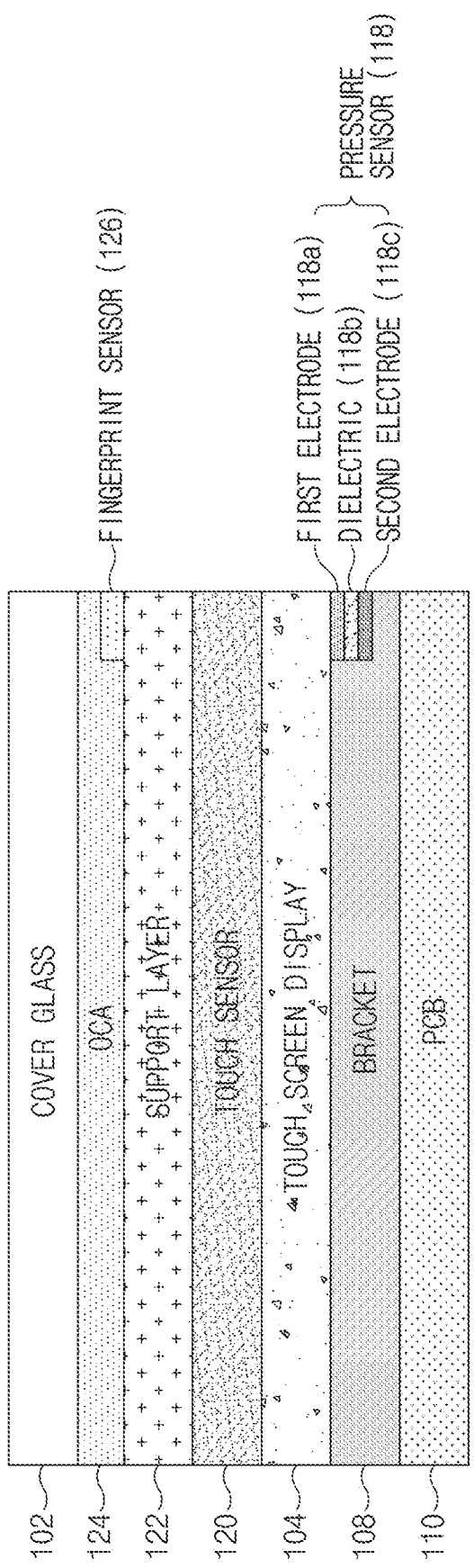
FIG. 2B is a sectional view illustrating the stack structure in which the fingerprint sensor is present above the pressure sensor, according to an embodiment.

FIG. 2A is a view illustrating a stack structure of the electronic device in which a fingerprint sensor is present above a pressure sensor, according to an embodiment. FIG. 2B is a sectional view illustrating the stack structure illustrated in FIG. 2A.

Figure 2C:
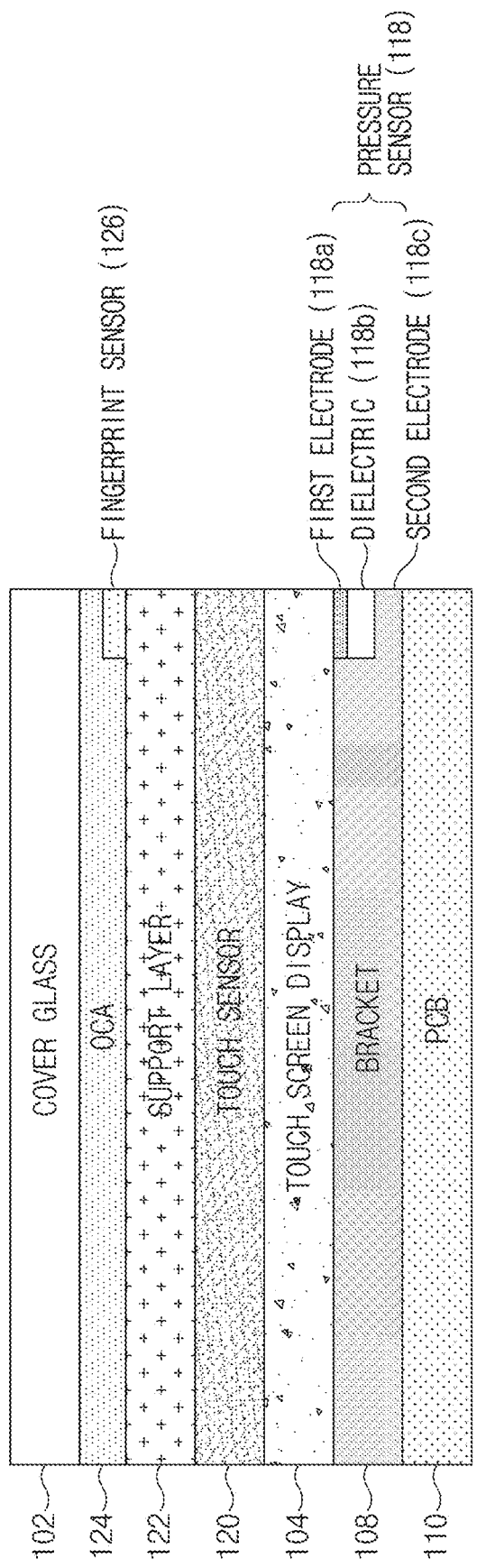
FIG. 2C is a sectional view illustrating a stack structure in which the fingerprint sensor is present above the pressure sensor and a dielectric is an air gap, according to an embodiment.

FIG. 2C is a sectional view illustrating a stack structure in which the fingerprint sensor is present above the pressure sensor and a dielectric is an air gap, according to an embodiment. FIG. 2C illustrates a modified example of the pressure sensor 118 in the stack structure of FIG. 2A.

In this disclosure, the foregoing descriptions set forth in conjunction with FIG. 1 may be identically applied to components having the same reference numerals as the components of the electronic device 100 illustrated in FIG. 1.

Referring to FIGS. 2A and 2B, the electronic device may include the cover glass 102, an optically clear adhesive (OCA) 124, a support layer 122, a touch sensor 120, the touch screen display 104, the pressure sensor 118, the bracket 108, and the PCB 110.

The OCA 124 may be an optically clear adhesive film that sticks the cover glass 102 and the touch screen display 104 together. The support layer 122 may be a film or glass for raising step coverage in a case where the fingerprint sensor 126 is disposed above the touch screen display 104.

The touch sensor 120 may be disposed between the cover glass 102 and the touch screen display 104. The touch sensor 120 may detect whether an external object 200 (e.g., a user's finger) makes contact with the cover glass 102. To this end, the touch sensor 120 may include a capacitive touch sensor, a pressure-sensitive touch sensor, a resistive touch sensor, an infrared touch sensor, or an ultrasonic touch sensor.

The fingerprint sensor 126 may be a sensor that detects the fingerprint of the external object 200 (e.g., the user's finger). To this end, the fingerprint sensor 126 may include a capacitive fingerprint sensor, an ultrasonic fingerprint sensor, or an optical fingerprint sensor. Furthermore, the fingerprint sensor 126 may include a first electrode, an insulator, and a second electrode.

Referring again to FIGS. 2A and 2B, the fingerprint sensor 126 may be disposed between the cover glass 102 and the touch sensor 120. The fingerprint sensor 126 may detect the fingerprint of the external object 200, based on a capacitance change of an area 102*a* where the external object 200 makes contact with the cover glass 102. For example, the capacitance of the area 102*a* may vary when the external object 200 does not make contact with the cover glass 102 and when the external object 200 makes contact with the cover glass 102. Furthermore, since the fingerprint has a corrugated surface, there may be a difference in capacitance between a portion in contact with the cover glass 102 and a portion not in contact with the cover glass 102. The fingerprint sensor 126 may detect the fingerprint, based on a capacitance change and a capacitance difference before and after the contact of the external object 200 with the cover glass 102.

Although FIGS. 2A and 2B illustrate an example that the fingerprint sensor 126 is located on a partial area of the support layer 122, the position, size, and shape of the fingerprint sensor 126 are not limited to those illustrated in FIGS. 2A and 2B.

The pressure sensor 118 may be electrically coupled to the PCB 110 and may be disposed on a partial area of the bracket 108. The pressure sensor 118 may include a first electrode 118*a*, a dielectric 118*b* disposed below the first electrode 118*a*, and a second electrode 118*c* disposed below the dielectric 118*b*. Although FIGS. 2A and 2B illustrate an example that the first electrode 118*a*, the dielectric 118*b*, and the second electrode 118*c* of the pressure sensor 118 have the same shape and are stacked one above another, the structure of the pressure sensor 118 is not limited to that illustrated in FIGS. 2A and 2B.

Referring again to FIGS. 2A and 2B, the pressure sensor 118 may detect the intensity of pressure applied to the cover glass 102, based on a capacitance change between the first electrode 118*a* and the second electrode 118*c*. For example, the first electrode 118*a* and the second electrode 118*c* may be moved toward each other by the pressure applied to the cover glass 102. When the first electrode 118*a* and the second electrode 118*c* are moved toward each other, the capacitance of the pressure sensor 118 may increase. The pressure sensor 118 may detect the intensity of the pressure applied to the cover glass 102, based on the capacitance increase.

Referring to FIG. 2C, the dielectric 118*b* may be an air gap between the first electrode 118*a* and the second electrode 118*c*, and the second electrode may be the bracket 108. The dielectric 118*b* may be an object in which electric charge is induced in an electric field. The air gap between the first electrode 118a and the bracket 108 in FIG. 2C may function as the dielectric 118b.

Although FIGS. 2A, 2B, and 2C illustrate an example that the pressure sensor 118 is located on a partial area of the bracket 108, the position, size, and shape of the pressure sensor 118 are not limited to those illustrated in FIGS. 2A, 2B, and 2C.

According to an embodiment, the fingerprint sensor 126 and the pressure sensor 118 may be disposed in an existing soft key area to provide the same function as a soft key on a full front screen. Furthermore, according to an embodiment, an extended area may be utilized as a screen.

Figure 3A:
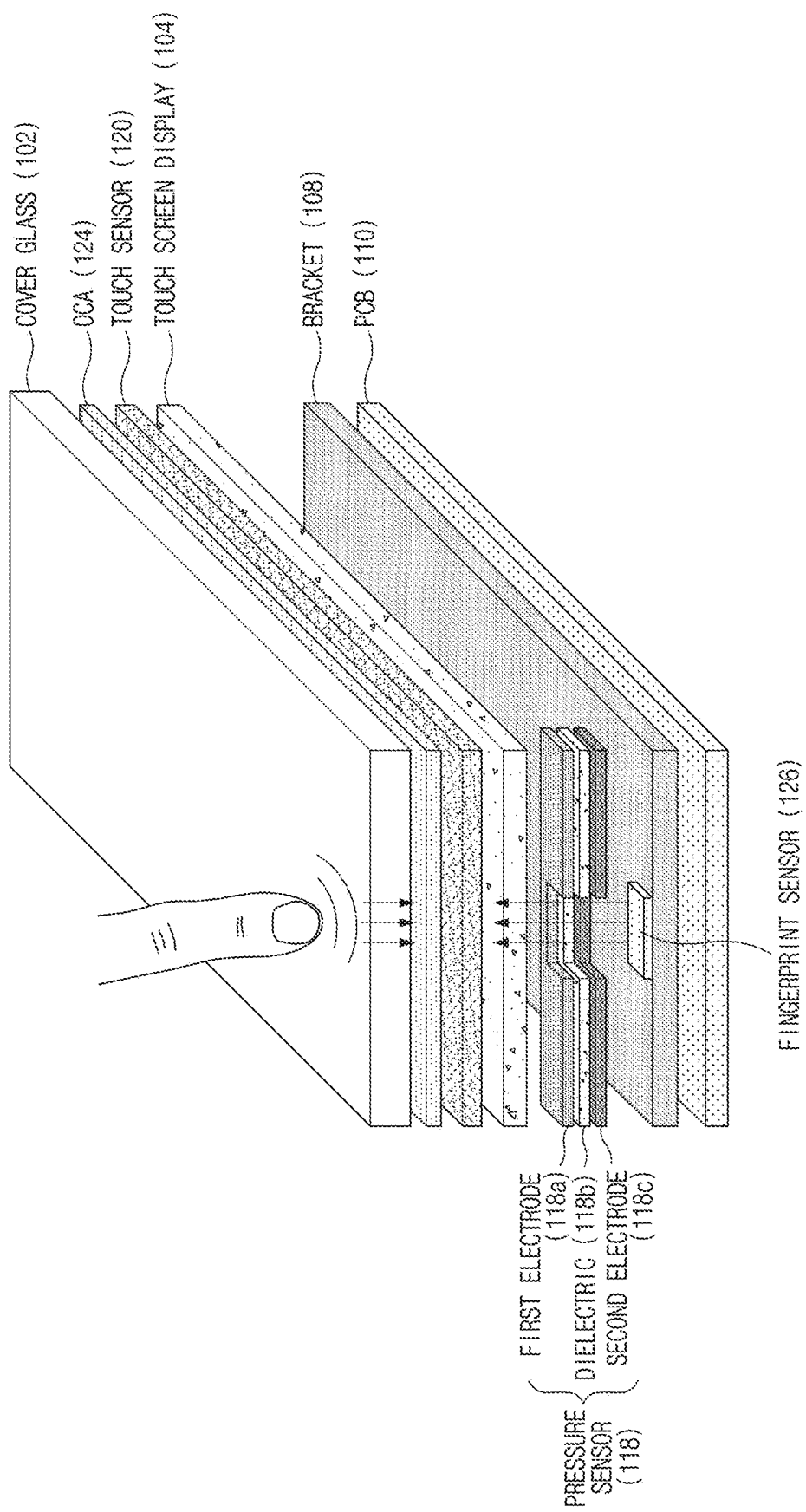
FIG. 3A is a view illustrating a stack structure of the electronic device in which the fingerprint sensor is present below the pressure sensor and a hole having the shape of the fingerprint sensor is present in a lower end portion of the pressure sensor, according to an embodiment.
Figure 3B:
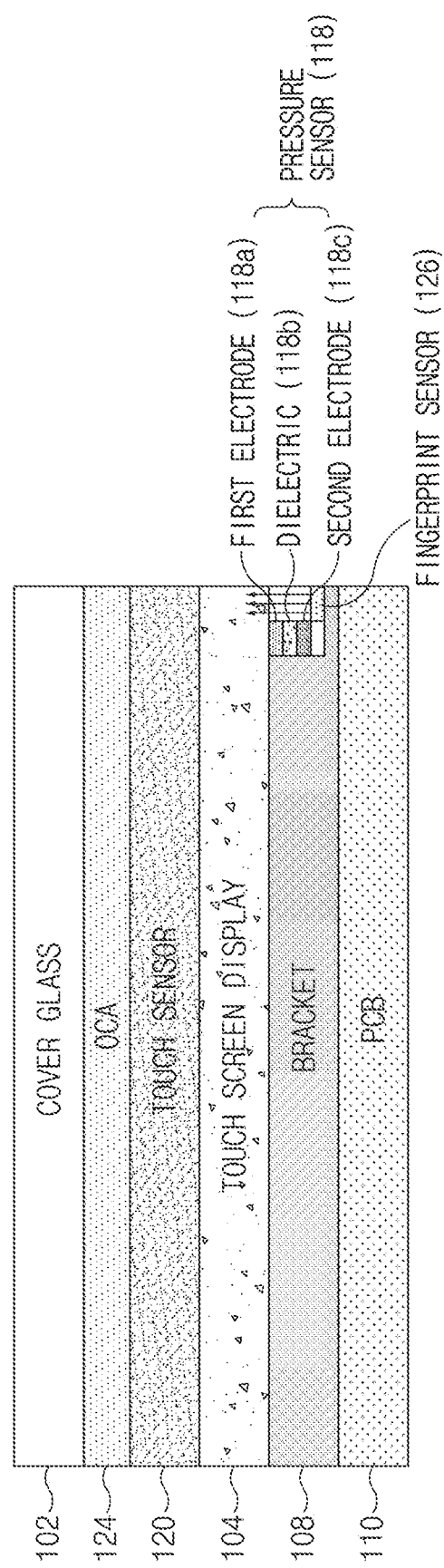
FIG. 3B is a sectional view illustrating the stack structure in which the fingerprint sensor is present below the pressure sensor and the hole having the shape of the fingerprint sensor is present in the lower end portion of the pressure sensor, according to an embodiment.

FIG. 3A is a view illustrating a stack structure of the electronic device in which the fingerprint sensor is present below the pressure sensor and a hole having the shape of the fingerprint sensor is present in a lower end portion of the pressure sensor, according to an embodiment. FIG. 3B is a sectional view illustrating the stack structure illustrated in FIG. 3A.

Figure 4A:
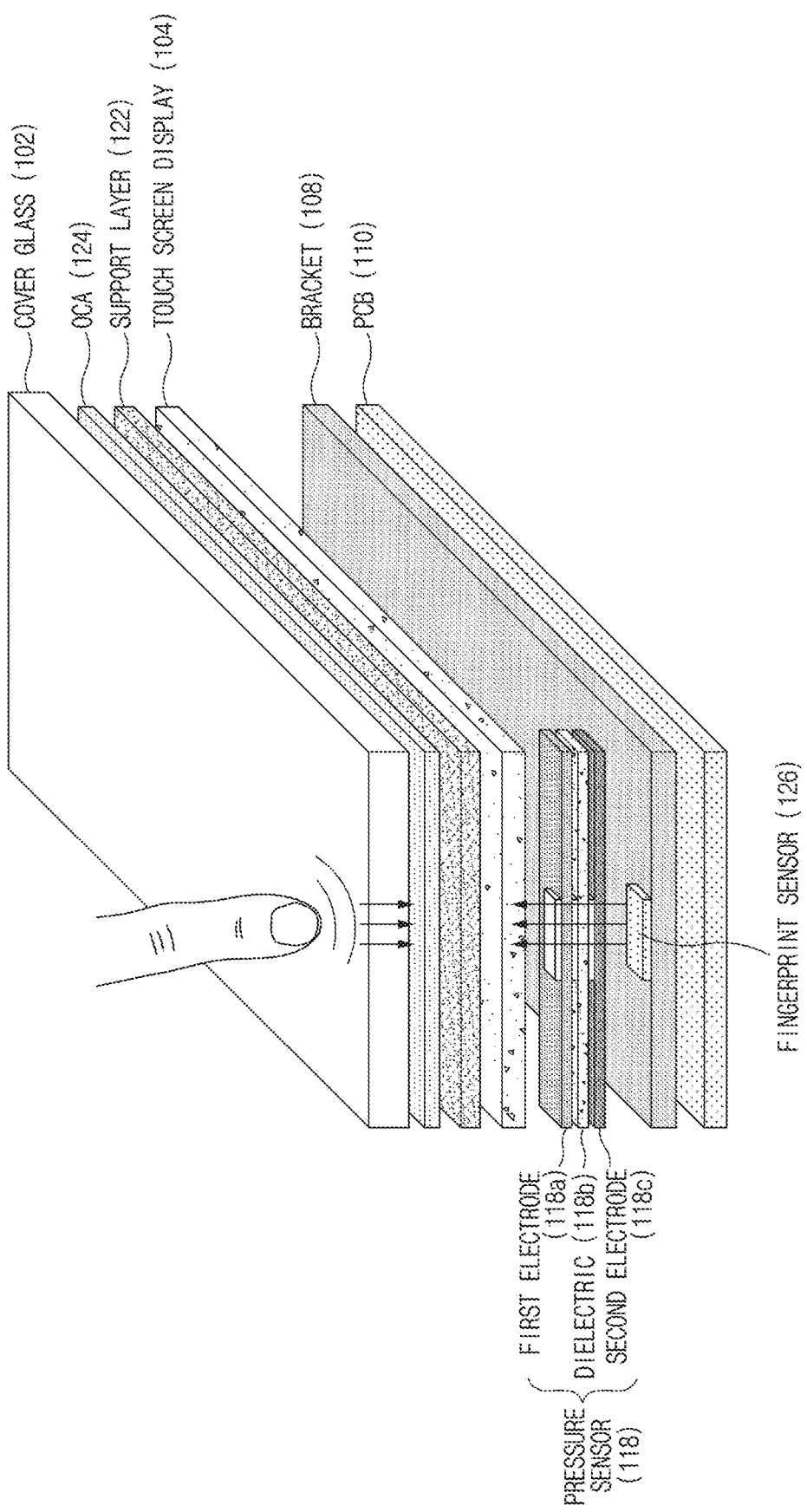
FIG. 4A is a view illustrating a stack structure of the electronic device in which the fingerprint sensor is present below the pressure sensor and a hole having the shape of the fingerprint sensor is present in the center of the pressure sensor, according to an embodiment.
Figure 4B:
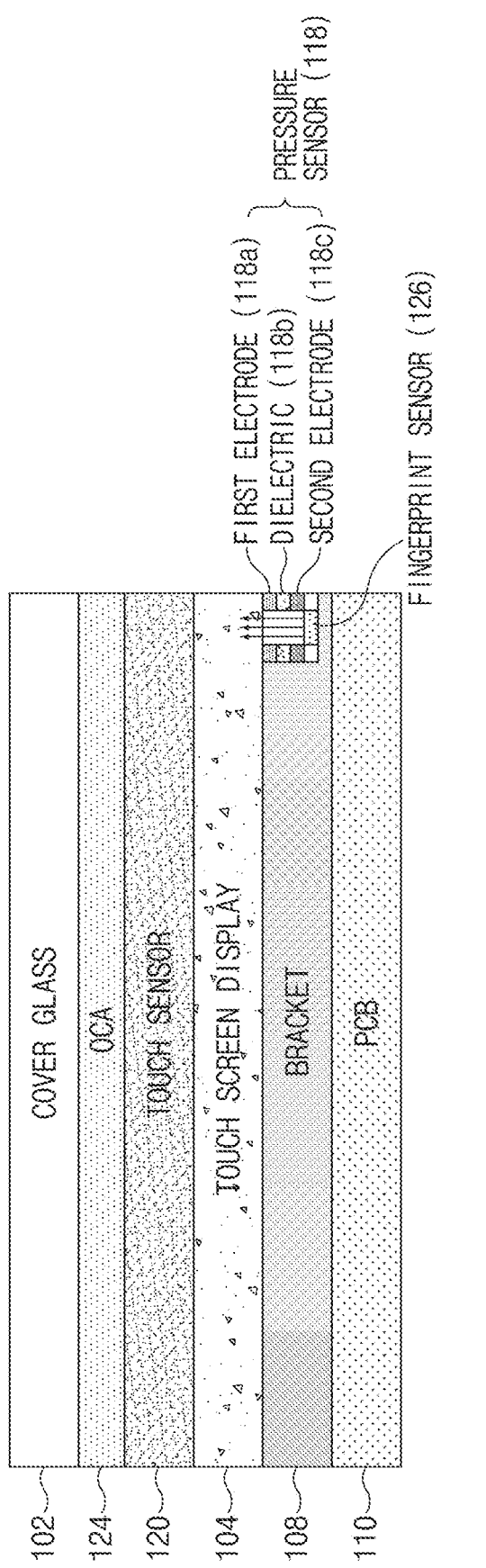
FIG. 4B is a sectional view illustrating the stack structure in which the fingerprint sensor is present below the pressure sensor and the hole having the shape of the fingerprint sensor is present in the center of the pressure sensor, according to an embodiment.

FIG. 4A is a view illustrating a stack structure of the electronic device in which the fingerprint sensor is present below the pressure sensor and a hole having the shape of the fingerprint sensor is present in the center of the pressure sensor, according to an embodiment. FIG. 4B is a sectional view illustrating the stack structure illustrated in FIG. 4A.

Referring to FIGS. 3A, 3B, 4A, and 4B, the fingerprint sensor 126 may be disposed below the pressure sensor 118. The pressure sensor 118 may have, in a partial area thereof, a hole having a shape corresponding to the fingerprint sensor 126. In FIGS. 3A and 3B, the hole having the shape of the fingerprint sensor 126 may be present in the lower end portion of the pressure sensor 118. In FIGS. 4A and 4B, the hole having the shape of the fingerprint sensor 126 may be present in the center of the pressure sensor 118.

In FIGS. 3A, 3B, 4A, and 4B, the fingerprint sensor 126 may be an ultrasonic fingerprint sensor or an optical fingerprint sensor. In a case where the fingerprint sensor 126 is an ultrasonic fingerprint sensor, the fingerprint sensor 126 may transmit ultrasonic waves to the cover glass 102 through the hole that is present in the pressure sensor 118. After the transmission of the ultrasonic waves, the fingerprint sensor 126 may detect the fingerprint of the external object 200, based on ultrasonic waves received through the hole after being reflected from the area 102a where the external object 200 makes contact with the cover glass 102.

In a case where the fingerprint sensor 126 is an optical fingerprint sensor, the fingerprint sensor 126 may transmit light to the cover glass 102 through the hole that is present in the pressure sensor 118. After the transmission of the light, the fingerprint sensor 126 may detect the fingerprint of the external object 200, based on light received through the hole after being reflected from the area 102a where the external object 200 makes contact with the cover glass 102.

Figure 5:
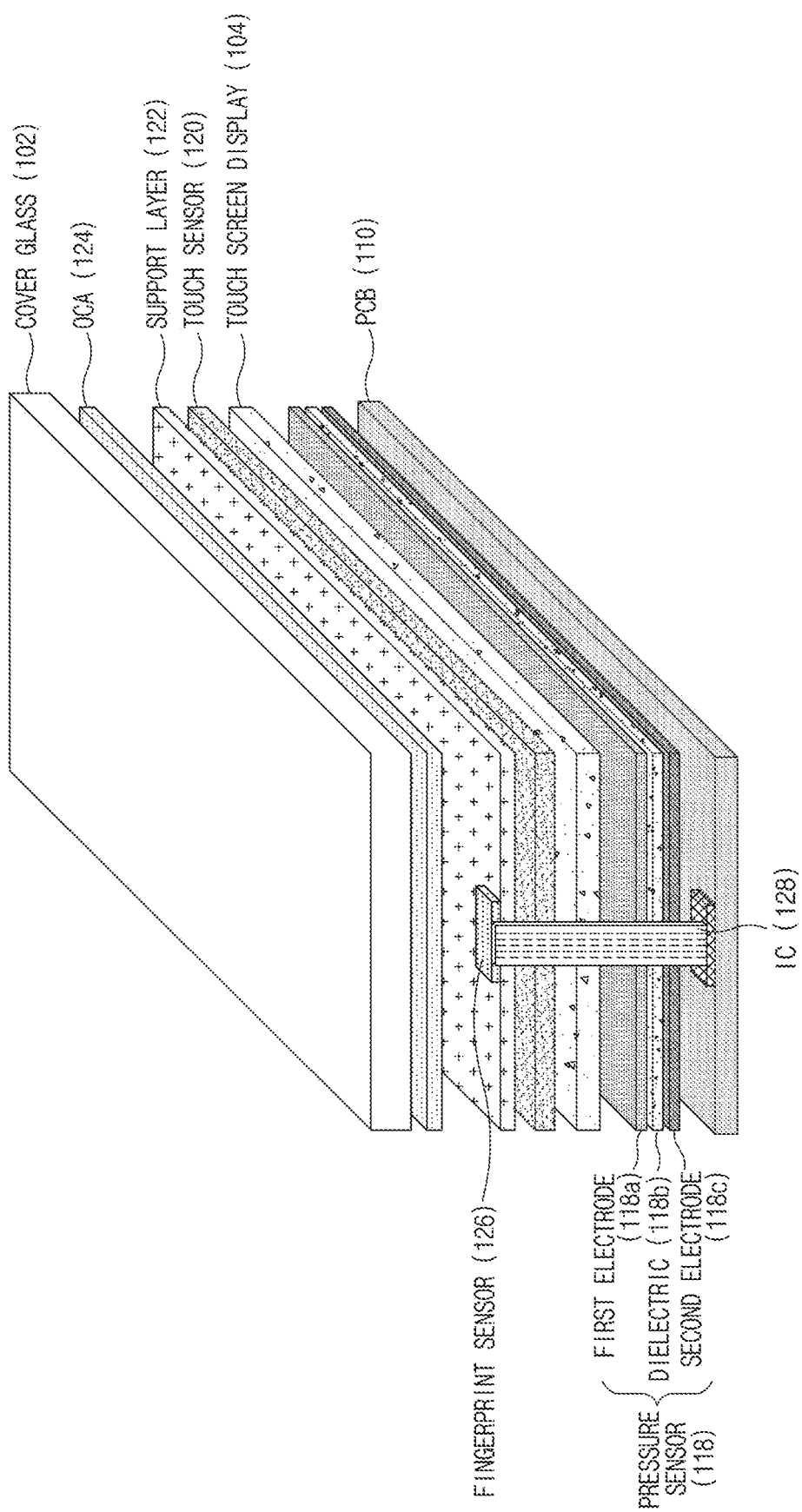
FIG. 5 is a view illustrating a stack structure of the electronic device in which the fingerprint sensor and the pressure sensor are coupled together through an integrated circuit, according to an embodiment.

FIG. 5 is a view illustrating a stack structure of the electronic device in which the fingerprint sensor and the pressure sensor are coupled together through an integrated circuit, according to an embodiment.

Referring to FIG. 5, the fingerprint sensor 126 disposed on the support layer 122, the pressure sensor 118, and the PCB 110 may be coupled with an integrated circuit (IC) 128. The fingerprint sensor 126 and the pressure sensor 118 may be coupled with the IC 128 through an FPCB along the space between the housing and the sensors 126 and 118. The IC 128 may be disposed on the PCB 110, and therefore the fingerprint sensor 126 and the pressure sensor 118 may be coupled with the PCB 110 through the FPCB and the IC 128. The pressure sensor 118 in FIG. 5 may be disposed on a portion of the bracket 108 or may be disposed on the entire surface of the bracket 108. The fingerprint sensor 126 may detect the external object 200 that makes contact with the cover glass 102, and may transmit relevant data to a processor mounted on the PCB 110. Furthermore, the pressure sensor 118 may detect the intensity of pressure applied to the cover glass 102 and may transmit relevant data to the processor mounted on the PCB 110. When the data is transmitted by the fingerprint sensor 126 and the pressure sensor 118, the processor may calculate the fingerprint and/or the intensity of the pressure.

According to the embodiments described above with reference to FIGS. 3A, 3B, 4A, 4B, and 5, various forms of stack structures may be provided by modifying the position of the fingerprint sensor 126 and the shape of the pressure sensor 118. Furthermore, the fingerprint sensor 126 and the pressure sensor 118 may be disposed in the existing soft key area to provide the same function as a soft key on a full front screen.

Figure 6A:
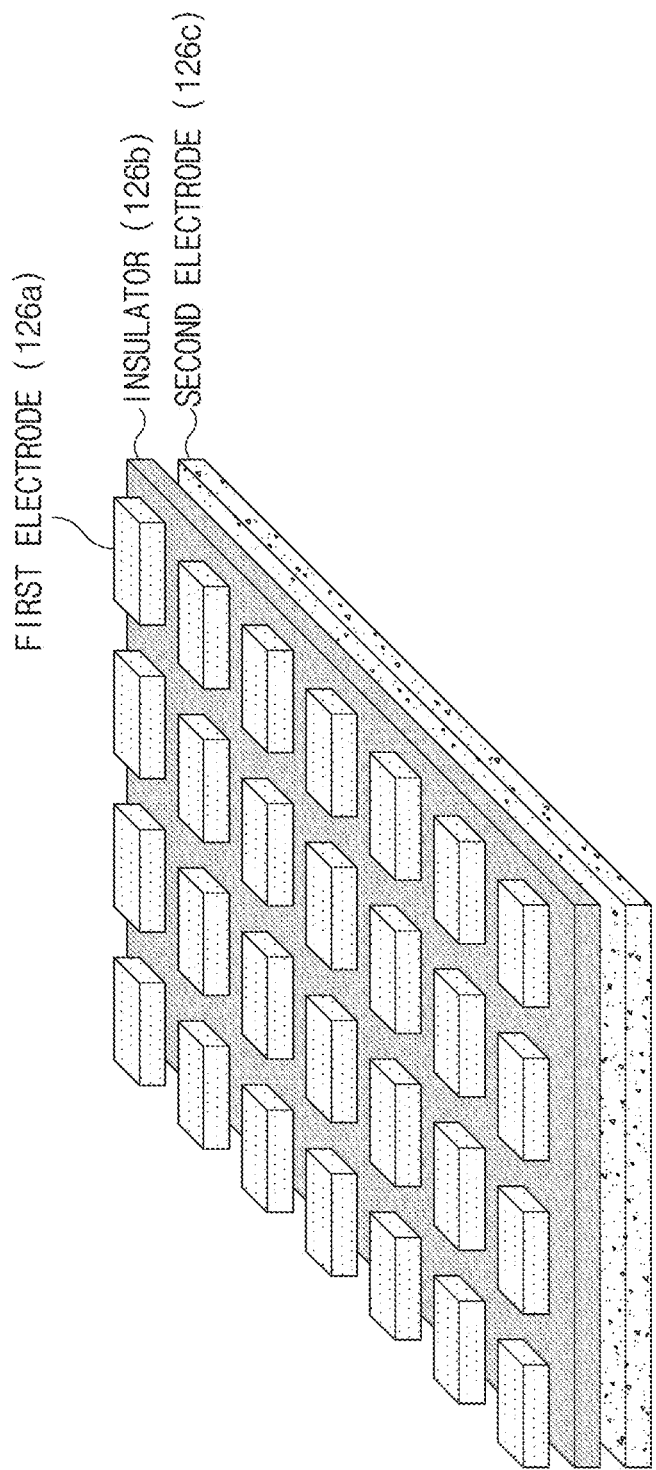
FIG. 6A is a view illustrating a stack structure of the fingerprint sensor according to an embodiment.

FIG. 6A is a view illustrating a stack structure of the fingerprint sensor 126 according to an embodiment.

Referring to FIGS. 1 and 6A, an insulator 126b may include a first surface facing a first direction and a second surface facing a second direction that is opposite to the first direction. One or more first electrodes 126a may be arranged on the first surface in the horizontal and vertical directions, and a second electrode 126c may be disposed on the second surface. In FIG. 6A, the first direction may be an upper direction facing away from the top side surface of the cover glass 102 illustrated in FIG. 1, and the second direction may be a lower direction facing away from the bottom side surface of the back cover 116 illustrated in FIG. 1.

In an embodiment, the electrode pattern illustrated in FIG. 6A may be an electrode pattern of a self-cap (self-capacitance) type. The fingerprint sensor 126 of a self-cap type may detect a fingerprint by sensing a variation in capacitance formed between a single electrode and a finger. Furthermore, the fingerprint sensor 126 of a self-cap type may recognize capacitance that varies when a finger makes contact with the cover glass 102, with the capacitance of an electrode itself as an initial value.

Figure 6B:
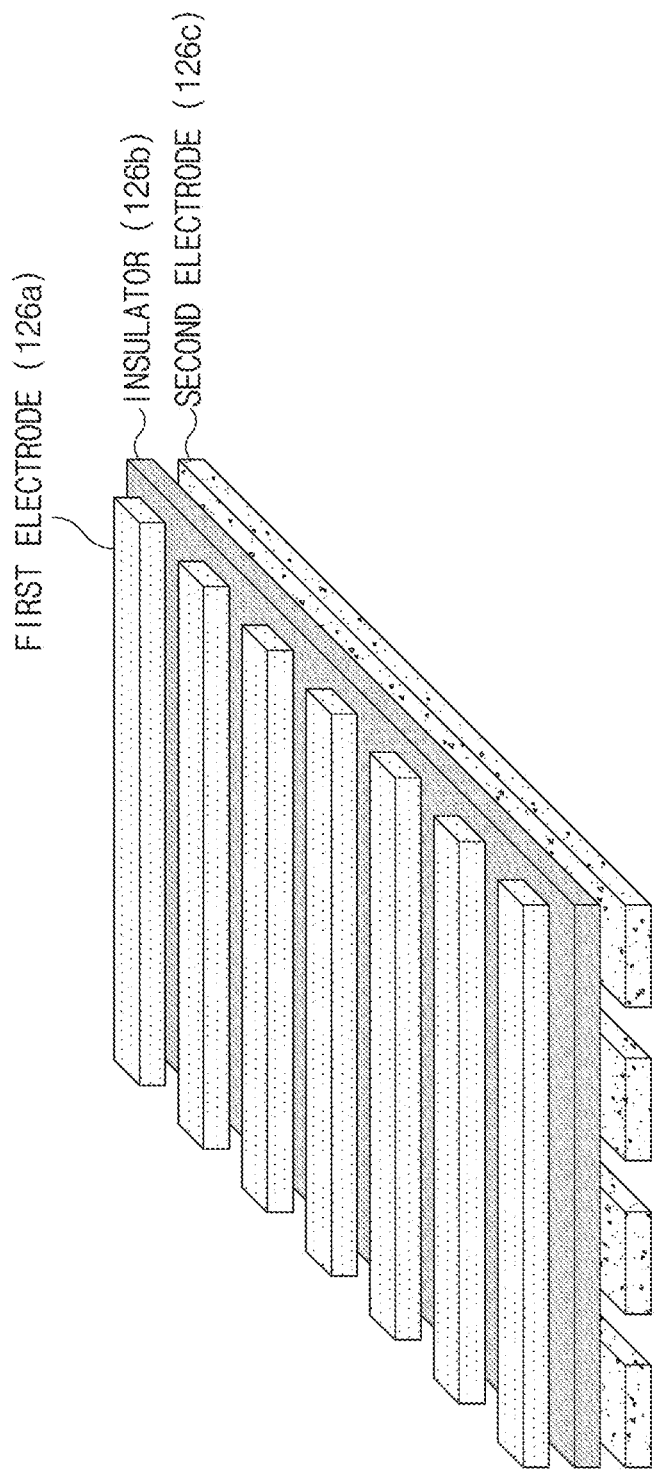
FIG. 6B is a view illustrating a stack structure of the fingerprint sensor according to another embodiment.

FIG. 6B is a view illustrating a stack structure of the fingerprint sensor 126 according to another embodiment.

Referring to FIGS. 1 and 6B, one or more first electrodes 126a may be arranged on the first surface in the horizontal or vertical direction. One or more second electrodes 126c may be arranged on the second surface in the vertical or horizontal direction.

In an embodiment, the electrode pattern illustrated in FIG. 6B may be an electrode pattern of a mutual-cap (mutual-capacitance) type. The fingerprint sensor 126 of a mutual-cap type may detect a fingerprint, based on a variation in capacitance formed between two electrodes. When an electric field generated by a transmit electrode is absorbed into a finger, capacitance may decrease, and the fingerprint sensor 126 of a mutual-cap type may detect a fingerprint, based on the decreased capacitance.

Figure 7A:
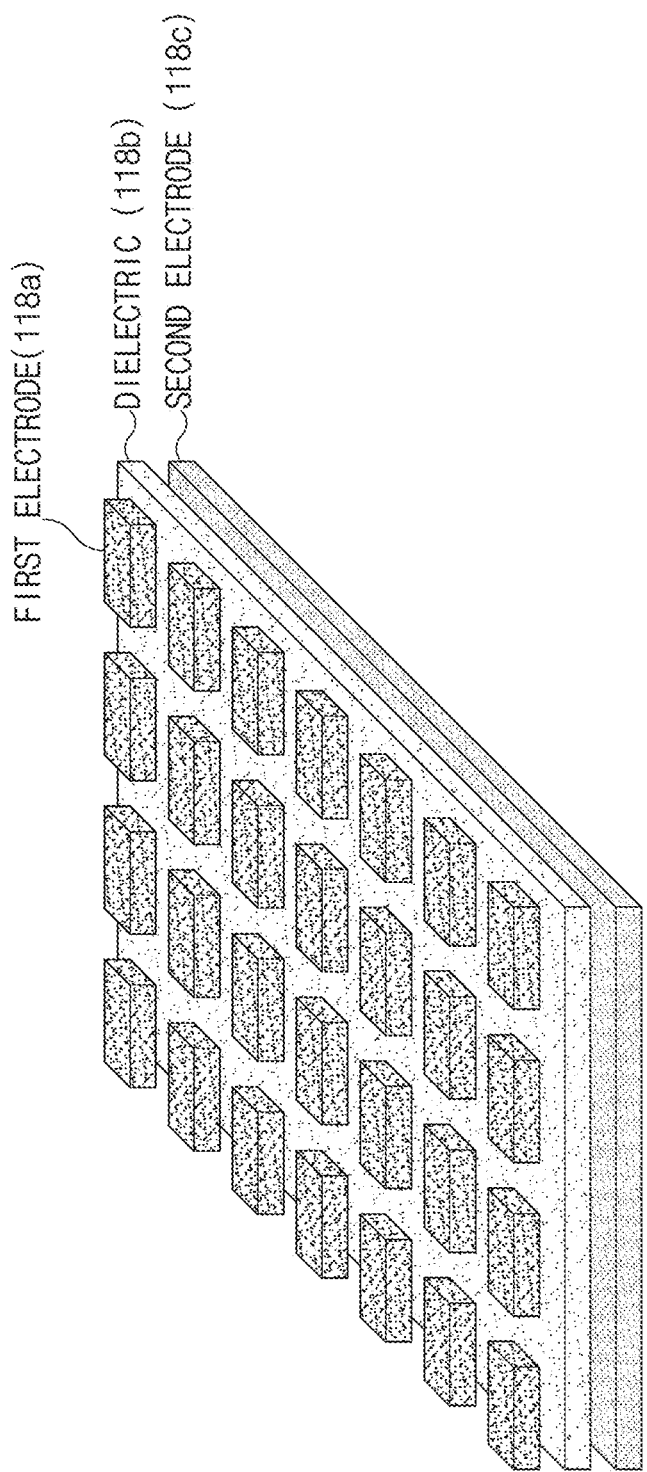
FIG. 7A is a view illustrating a stack structure of the pressure sensor according to an embodiment.

FIG. 7A is a view illustrating a stack structure of the pressure sensor 118 according to an embodiment.

The electrode pattern illustrated in FIG. 7A may be an electrode pattern of a self-cap type and may be substantially the same as the electrode pattern described above with reference to FIG. 6A, except that the dielectric 118b is disposed between the first electrodes 118a and the second electrode 118c.

Figure 7B:
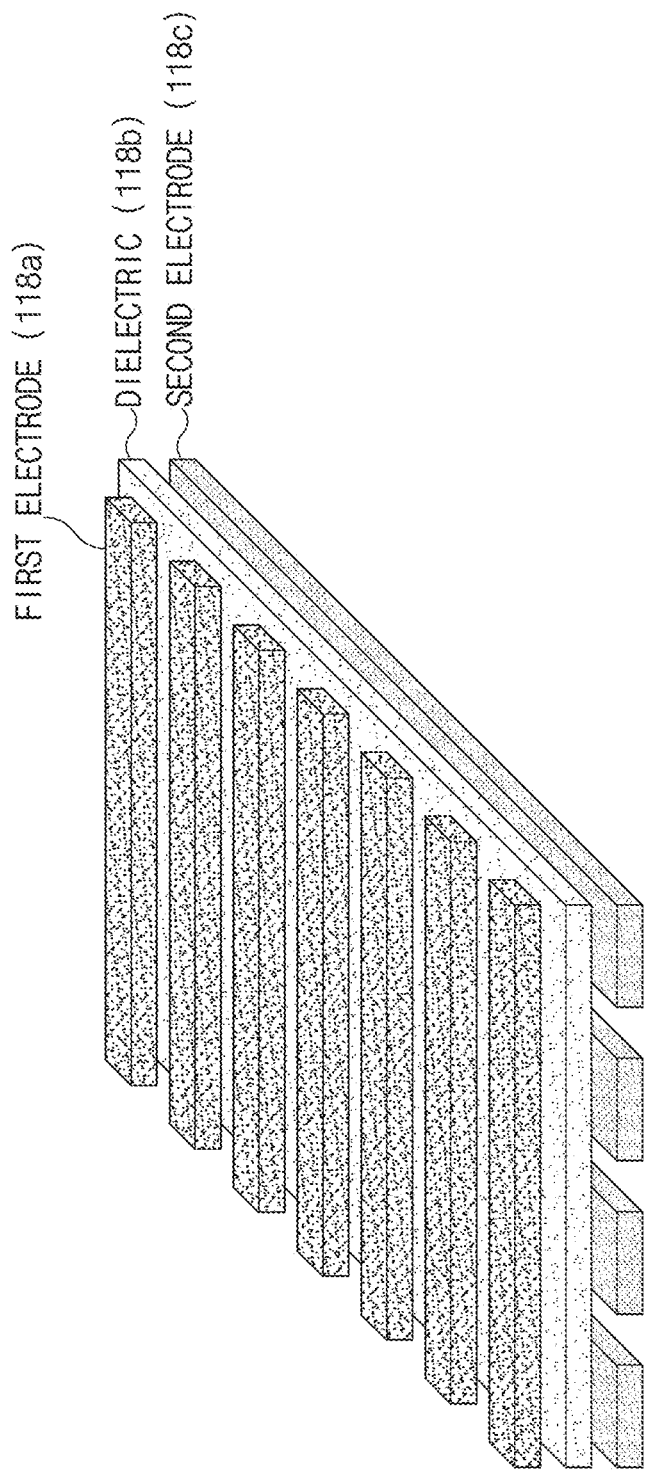
FIG. 7B is a view illustrating a stack structure of the pressure sensor according to another embodiment.

FIG. 7B is a view illustrating a stack structure of the pressure sensor 118 according to another embodiment.

The electrode pattern illustrated in FIG. 7B may be an electrode pattern of a mutual-cap type and may be substantially the same as the electrode pattern described above with reference to FIG. 6B, except that the dielectric 118b is disposed between the first electrodes 118a and the second electrodes 118c.

According to the embodiments described above with reference to FIGS. 6A, 6B, 7A, and 7B, various forms of fingerprint sensors 126 and pressure sensors 118 may be provided by modifying the stack structures of the fingerprint sensor 126 and the pressure sensor 118. Furthermore, according to an embodiment of the present disclosure, various forms of fingerprint sensing methods and pressure sensing methods may be provided by modifying the stack structures of the fingerprint sensor 126 and the pressure sensor 118.

Figure 8:
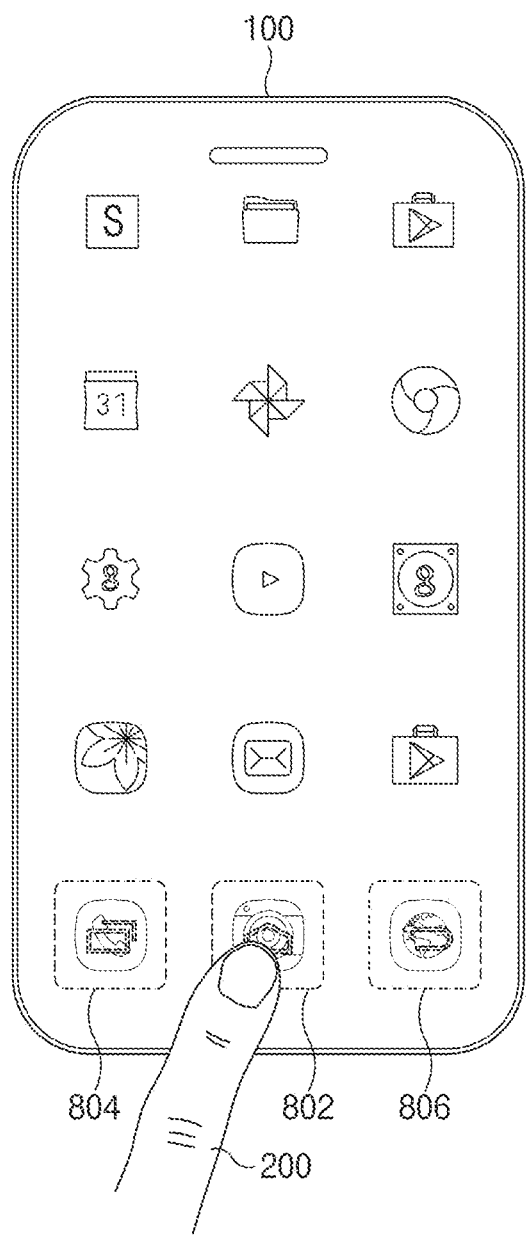
FIG. 8 is a view illustrating an external object that makes contact with the electronic device according to an embodiment.

FIG. 8 is a view illustrating an external object that makes contact with the electronic device according to an embodiment. Hereinafter, the electronic device according to an embodiment of the present disclosure will be described with reference to FIGS. 1 and 8.

Referring to FIGS. 1 and 8, the electronic device 100 may include a housing, the touch screen display 104, the pressure sensor 118, a wireless communication circuit, a processor, and memory.

The housing may include an outer surface. The housing may have a form in which the cover glass 102, the rear housing 112, and the back cover 116, which have been described above with reference to FIG. 1, are combined together. The touch screen display 104 may be exposed through at least a portion of the outer surface of the housing. The pressure sensor 118 may detect pressure exerted by the external object 200 (e.g., a user's finger).

The wireless communication circuit may be located inside the housing. At least one processor may be electrically coupled to the touch screen display 104, the pressure sensor 118, and the wireless communication circuit. The memory may be electrically coupled to the processor and may store instructions.

The instructions stored in the memory, when executed, may cause the processor to display a user interface that includes an object. The object may at least partly overlap an area on the touch screen display 104. For example, the object may include at least one of an application icon, a keypad, or a thumbnail image.

In an embodiment, the instructions may cause the processor to detect contact with the object by using the touch screen display 104. Furthermore, the instructions may cause the processor to detect pressure applied to the area with which the external object 200 makes contact, by using the pressure sensor 118.

In an embodiment, the instructions may cause the processor to perform a first function associated with the object or a normal second function of the electronic device, based on at least part of the detected contact and/or the detected pressure. For example, in FIG. 8, the processor may execute a home key function or a camera function when the external object 200 makes contact with an area 802 and a camera application icon is present in the area 802. The processor may execute a menu key function or a voice call when the external object 200 makes contact with an area 804 and a voice call icon is present in the area 804. The processor may execute a back key function or the Internet when the external object 200 makes contact with an area 806 and an internet icon is present in the area 806.

In an embodiment, the instructions may cause the processor to additionally display, on the touch screen display 104, a key (or a button) that represents the second function, based on at least part of the detected contact and the detected pressure. The key (or the button) may include at least one of a home key, a volume control key, or a power key. In this disclosure, a key may be interchangeable with a button. The home key may be a home button, and the volume control key may be a volume button. For example, in FIG. 8, the home key may be displayed when the external object 200 makes contact with the area 802, and a menu key may be displayed when the external object 200 makes contact with the area 804. Furthermore, a back key may be displayed when the external object 200 makes contact with the area 806.

Figure 9:
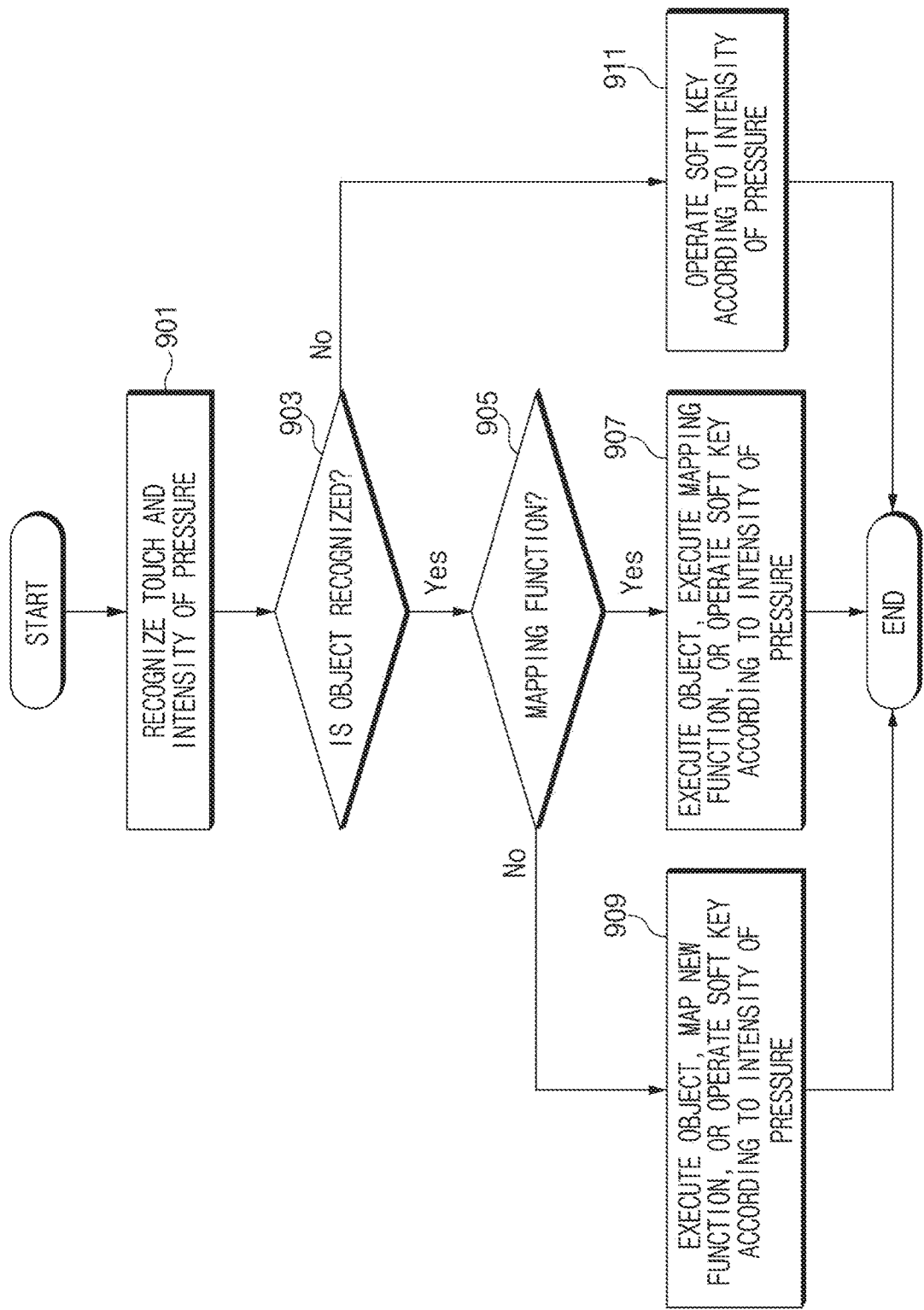
FIG. 9 is a flowchart illustrating an operation of the electronic device according to an embodiment.

FIG. 9 is a flowchart illustrating an operation of the electronic device according to an embodiment.

When the external object 200 makes contact with the cover glass 102, the touch sensor 120 may, in operation 901, detect whether the external object 200 makes contact with the cover glass 102. Furthermore, in operation 901, the pressure sensor 118 may detect the intensity of pressure applied to the area where the external object 200 makes contact with the cover glass 102.

In an embodiment, when the contact of the external object 200 and the intensity of the pressure are detected, the processor may, in operation 903, determine whether an object is present in the area where the external object 200 makes contact with the cover glass 102. For example, when a camera application is present in the area 802 in FIG. 8, the processor may determine that an object is present in the area 802.

When it is determined that the object is present in the area where the external object 200 makes contact with the cover glass 102, the processor may, in operation 905, determine whether there is a mapping function. The mapping function may be a function associated with the pressure applied to the area where the external object 200 makes contact with the cover glass 102, and may be any one of functions of the object. For example, when the object is a video playback application, the mapping function may be a freeze-frame function or a screen recording function. Alternatively, when the object is a camera application, the mapping function may be a video recording function, a continuous shooting function, or a photo search function.

When it is determined that the mapping function is present, the processor may, in operation 907, execute the object, execute the mapping function, or operate a soft key according to the intensity of the pressure. When it is determined that no mapping function is present, the processor may, in operation 909, execute the object, map a new function, or operate a soft key according to the intensity of the pressure.

Meanwhile, when it is determined in operation 903 that no object is present in the area where the external object 200 makes contact with the cover glass 102, the processor may, in operation 911, operate a soft key according to the intensity of the pressure.

Figure 10A:
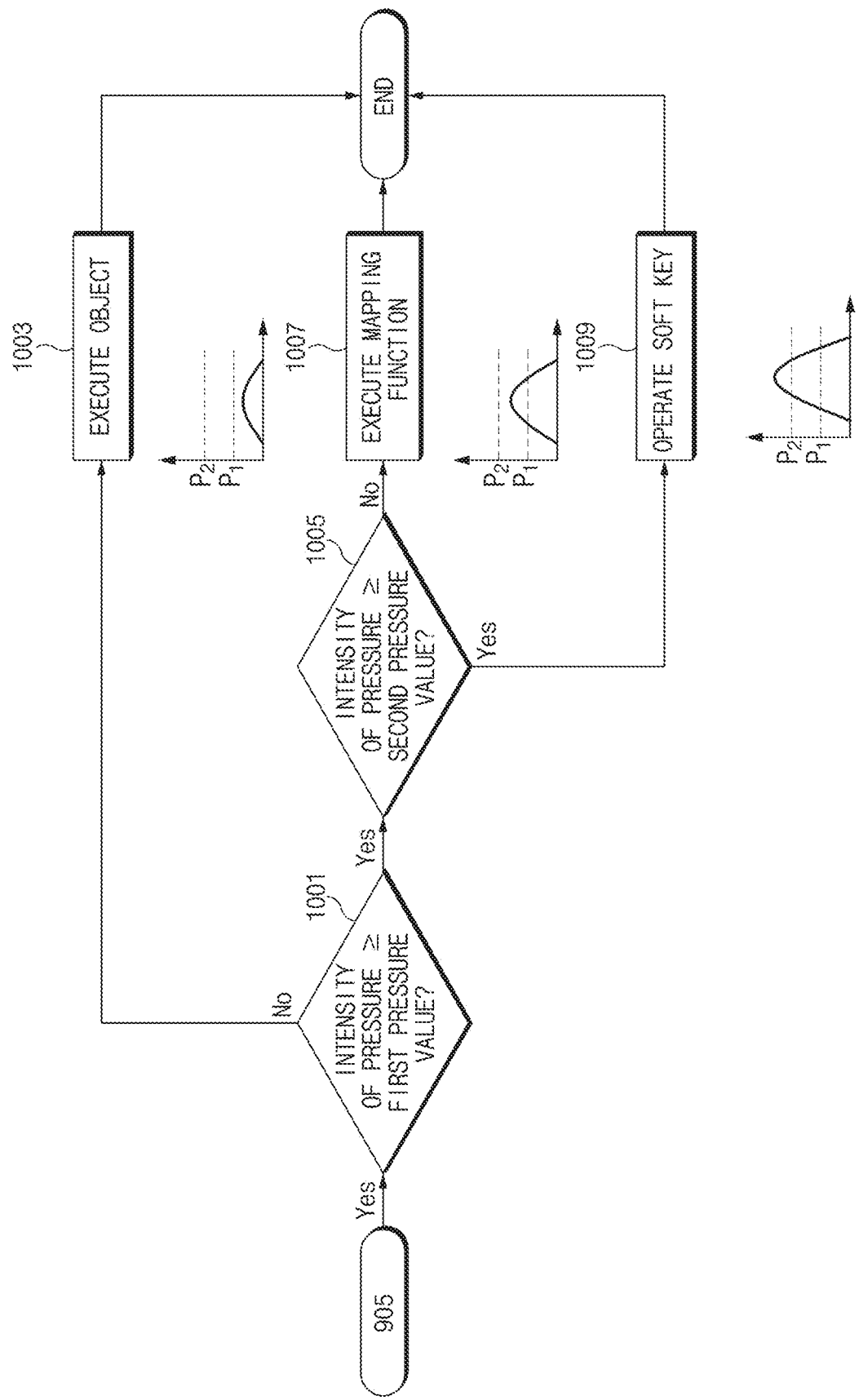
FIG. 10A is a flowchart illustrating an operation of the electronic device in a case where a mapping function is present, according to an embodiment.
Figure 10B:
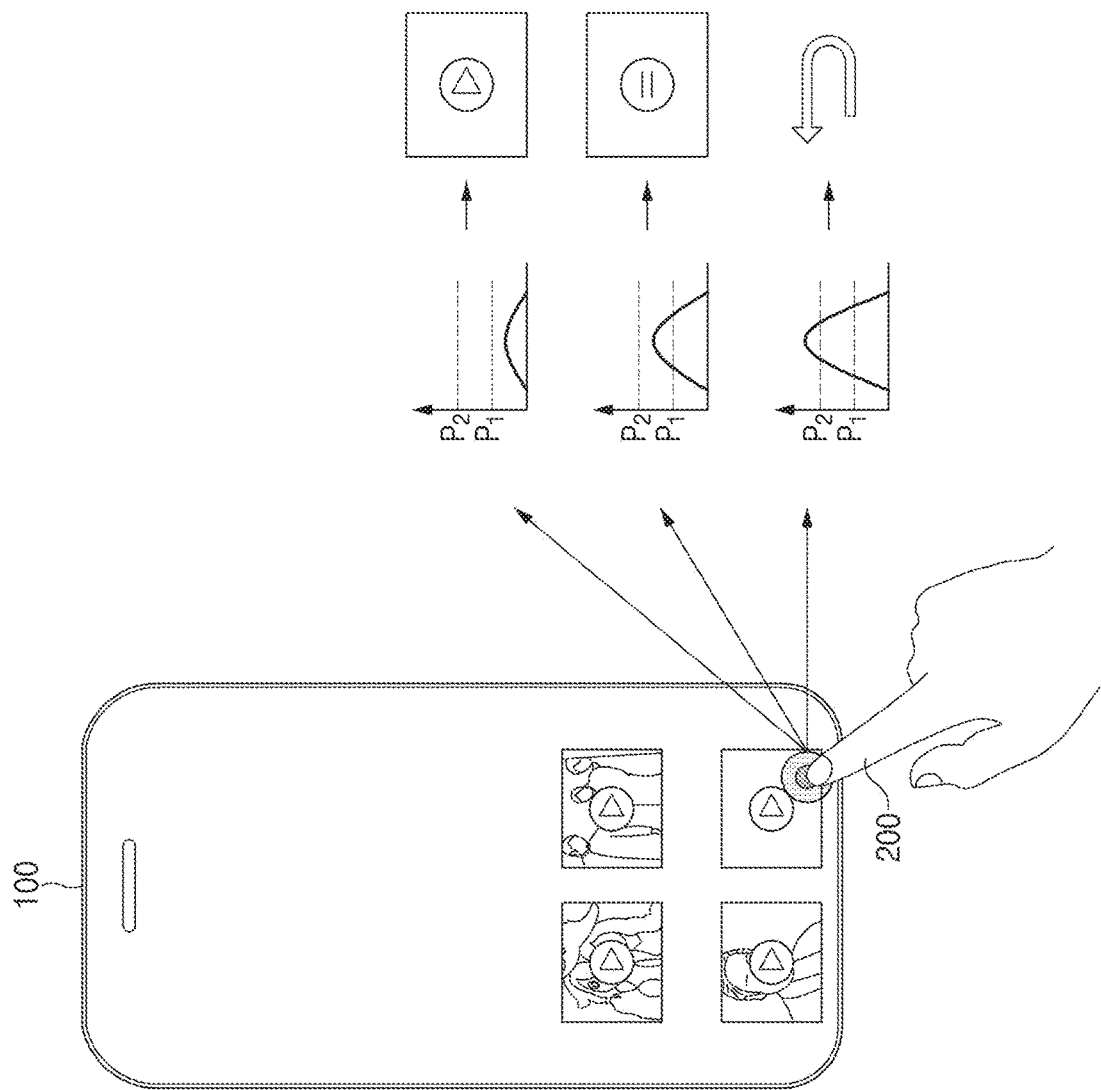
FIG. 10B is a view illustrating the electronic device that operates according to the intensity of pressure in the case where the mapping function is present.

FIG. 10A is a flowchart illustrating an operation of the electronic device in the case where the mapping function is present, according to an embodiment. FIG. 10B is a view illustrating the electronic device that operates according to the intensity of the pressure in the case where the mapping function is present.

Referring to FIG. 10A, when it is determined in operation 905 that the mapping function is present, the processor may, in operation 1001, compare the intensity of the pressure with a first pressure value. When it is determined that the intensity of the pressure is less than the first pressure value, the processor may, in operation 1003, execute the object. Referring to FIG. 10B, when the object is a video playback application and the intensity of the pressure is less than the first pressure value, the processor may execute a video.

Referring again to FIG. 10A, when it is determined in operation 1001 that the intensity of the pressure is greater than the first pressure value, the processor may, in operation 1005, compare the intensity of the pressure with a second pressure value. When it is determined that the intensity of the pressure is less than the second pressure value, the processor may, in operation 1007, execute the mapping function. Referring to FIG. 10B, when the object is a video playback application and the intensity of the pressure is greater than or equal to the first pressure value and less than the second pressure value, the processor may execute a freeze-frame function.

Referring again to FIG. 10A, when it is determined in operation 1005 that the intensity of the pressure is greater than or equal to the second pressure value, the processor may, in operation 1009, operate a soft key function. Referring to FIG. 10B, the processor may execute the back key among the soft keys. Meanwhile, when a user presses the home key rather than the back key among the soft keys, the processor may display a home screen including a plurality of application icons. The key that operates in operation 1009 is not limited to the back key and the home key and may be the menu key, the volume control key, or the power key.

Figure 11:
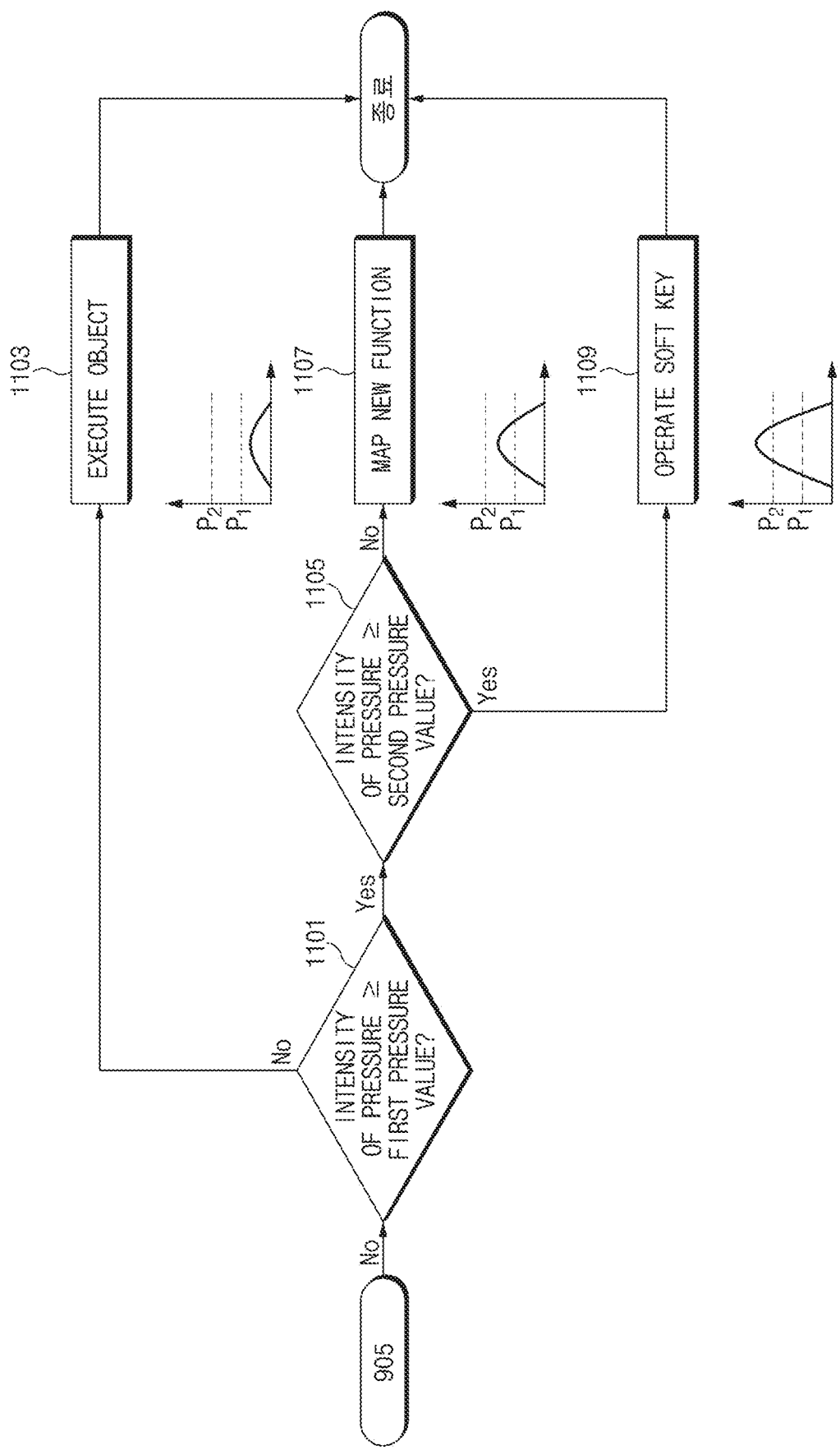
FIG. 11 is a flowchart illustrating an operation of the electronic device in a case where no mapping function is present, according to an embodiment.

FIG. 11 is a flowchart illustrating an operation of the electronic device in the case where no mapping function is present, according to an embodiment.

Referring to FIG. 11, when it is determined in operation 905 that there is no function mapped with the object, the processor may, in operation 1101, compare the intensity of the pressure with the first pressure value. When it is determined in operation 1101 that the intensity of the pressure is less than the first pressure value, the processor may, in operation 1103, execute the object. Operations 1101 and 1103 may be substantially the same as operation 1001 and 1003 described above with reference to FIG. 10A.

When it is determined in operation 1101 that the intensity of the pressure is greater than the first pressure value, the processor may, in operation 1105, compare the intensity of the pressure with the second pressure value. When it is determined that the intensity of the pressure is less than the second pressure value, the processor may, in operation 1107, set any one of functions of the object to a mapping function. For example, when the object is a video playback application, the processor may set any one of a freeze-frame function and a screen recording function to a mapping function. Alternatively, when the object is a camera application, the processor may set any one of a video recording function, a continuous shooting function, and a photo search function to a mapping function. When the same pressure is applied again to the object after the setting of the mapping function, operations 1001, 1005, and 1007 described above with reference to FIG. 10A may be performed.

When it is determined in operation 1105 that the intensity of the pressure is greater than or equal to the second pressure value, the processor may, in operation 1109, operate the soft key function. Operation 1109 may be substantially the same as operation 1009 described above with reference to FIG. 10A.

Figure 12A:
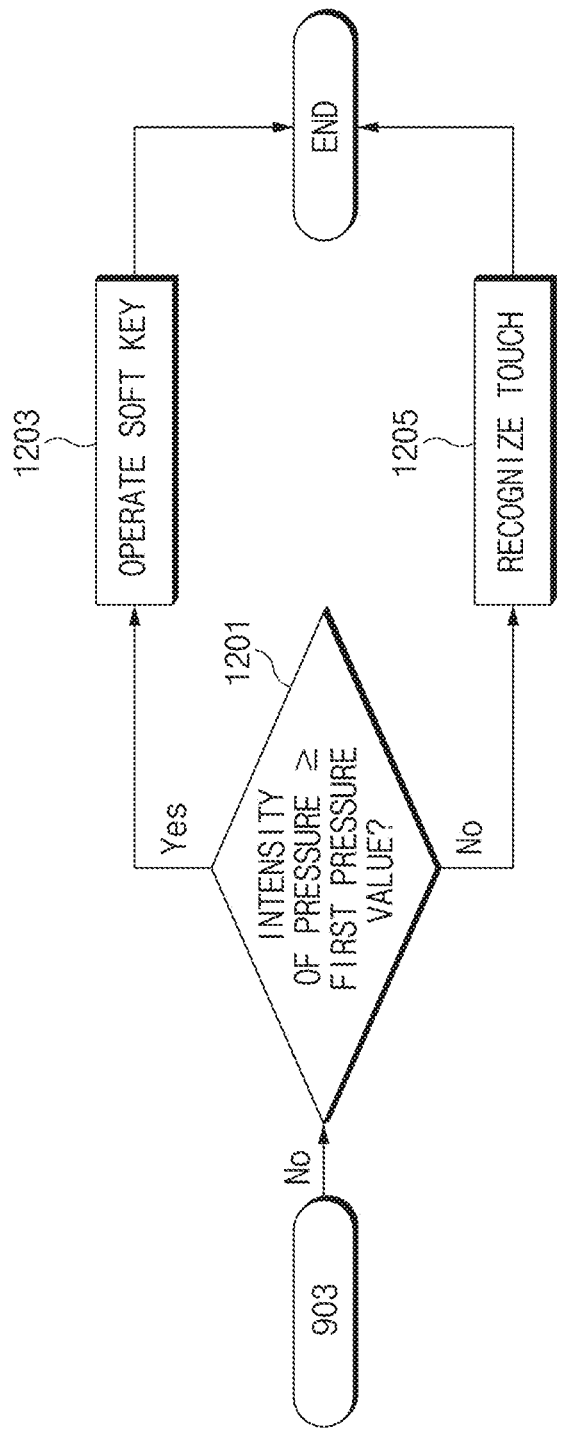
FIG. 12A is a flowchart illustrating an operation of the electronic device in a case where no object is present in an area where an external object makes contact with a cover glass, according to an embodiment.
Figure 12B:
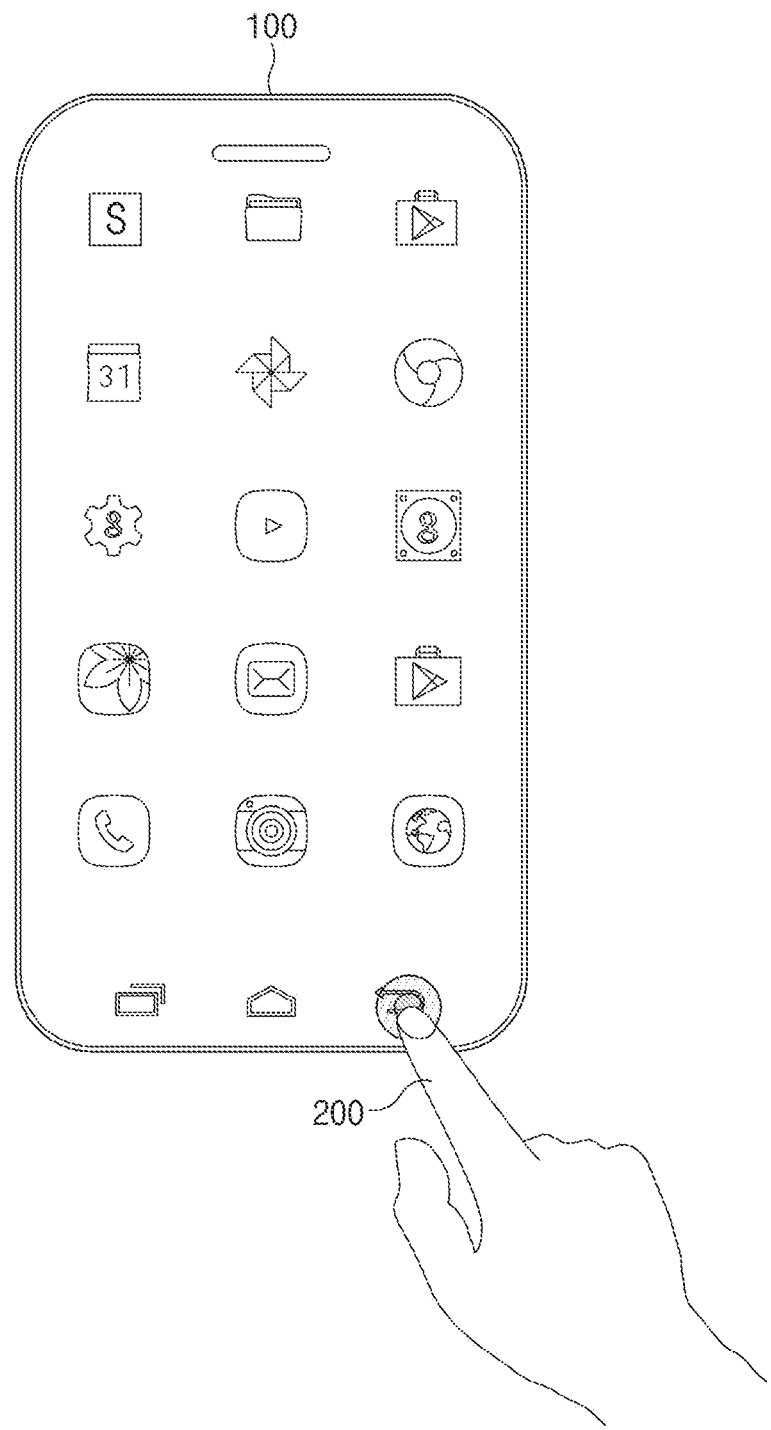
FIG. 12B is a view illustrating the electronic device in which no object is present in the area where the external object makes contact with the cover glass.

FIG. 12A is a flowchart illustrating an operation of the electronic device in the case where no object is present in the area where the external object 200 makes contact with the cover glass 102, according to an embodiment. FIG. 12B illustrates the electronic device in which no object is present in the area where the external object 200 makes contact with the cover glass 102.

Referring to FIG. 12A, when it is determined in operation 903 that no object is present in the area where the external object 200 makes contact with the cover glass 102, the processor may, in operation 1201, compare the intensity of the pressure with the first pressure value. When it is determined that the intensity of the pressure is greater than or equal to the first pressure value, the processor may, in operation 1203, operate a soft key. The key that operates in operation 1203 may be the home key, the menu key, the back key, the volume control key, or the power key. Meanwhile, when it is determined in operation 1201 that the intensity of the pressure is less than the first pressure value, the processor may recognize the contact of the external object 200 with the cover glass 102 as a touch.

Referring to FIG. 12B, when no object is present in the area where the external object 200 makes contact with the cover glass 102, the processor, as described above with reference to FIG. 12A, may operate a soft key, or may recognize the contact as a touch, according to the intensity of the pressure. Furthermore, the processor may operate the soft key irrespective of the intensity of the pressure. In another embodiment, the processor may recognize the contact as a touch irrespective of the intensity of the pressure.

The first pressure value and the second pressure value in the embodiments illustrated in FIGS. 9 to 12B may be set by a user, or may be modified based on the intensities of pressures that are repeatedly input to the cover glass 102. For example, when the user applies pressures of 4.9 Pa, 5 Pa, and 5.1 Pa to the area, where the external object 200 makes contact with the cover glass 102, to operate the home key, the pressure values may be stored in the memory. The processor may set the first pressure value, based on the pressure values. The first pressure value may be 5 Pa. Furthermore, when the user applies pressures of 4.9 Pa, 4.9 Pa, and 5 Pa to operate the home key after the setting of the first pressure value, the first pressure value may be modified to 4.9 Pa.

According to the embodiments described above with reference to FIGS. 9 to 12B, user convenience may be increased by executing a function associated with the object or a normal function of the electronic device by comparing the intensity of the pressure with the first and second pressure values. Furthermore, the optimized electronic device may be provided to the user by consistently updating a reference pressure value.

Figure 13:
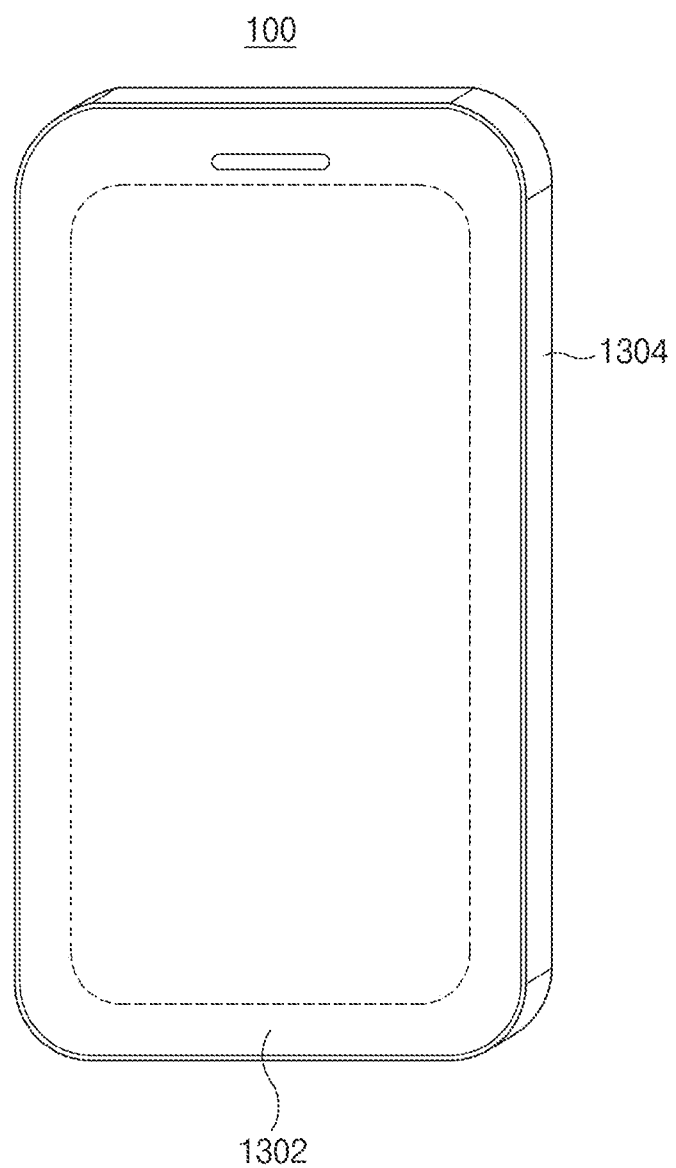
FIG. 13 is a view illustrating a first periphery and a first side of the electronic device according to an embodiment.
Figure 14:
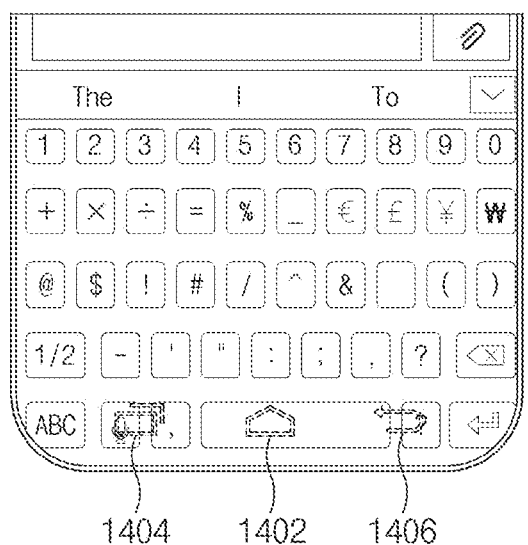
FIG. 14 is a view illustrating soft keys and a keypad of the electronic device according to an embodiment.
Figure 15:
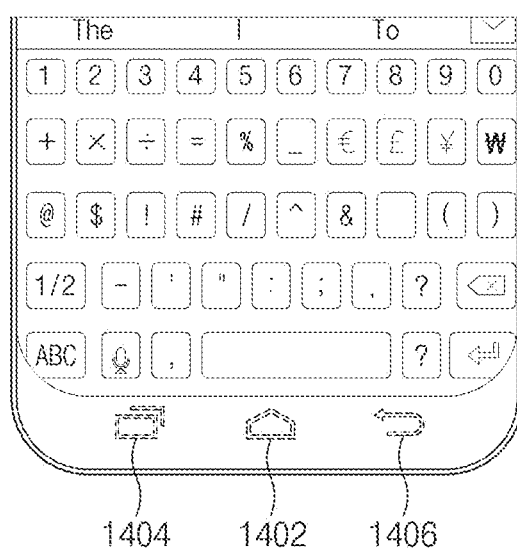
FIG. 15 is a view illustrating the keypad spaced apart from the first side, according to an embodiment.

FIG. 13 is a view illustrating a first periphery and a first side of the electronic device according to an embodiment. FIG. 14 is a view illustrating soft keys and a keypad of the electronic device according to an embodiment. FIG. 15 is a view illustrating the keypad spaced apart from the first side, according to an embodiment. Hereinafter, the electronic device according to an embodiment of the present disclosure will be described with reference to FIGS. 13 to 15.

Referring to FIGS. 13 to 15, the electronic device 100 may include the housing, the touch screen display 104, the pressure sensor 118, the wireless communication circuit, at least one processor, and the memory.

The housing may include a first surface facing a first direction and a second surface facing a second direction that is opposite to the first direction. The first surface may include a first periphery 1302. Referring to FIGS. 1 and 13, the first direction may be an upper direction facing away from the top side surface of the cover glass 102, and the second direction may be a lower direction facing away from the bottom side surface of the back cover 116. Furthermore, the first surface may be the top side surface of the cover glass 102, and the second surface may be the bottom side surface of the back cover 116. Moreover, the housing may have a form in which the cover glass 102, the rear housing 112, and the back cover 116, which have been described above with reference to FIG. 1, are combined together.

The touch screen display 104 may be located between the first surface and the second surface and may be exposed through the first surface. Furthermore, the touch screen display 104 may include a first side 1304 extending along the first periphery 1302 of the first surface. Referring to FIG. 13, the first side 1304 may be a side of the electronic device. In an embodiment, the first side 1304 of the touch screen display 104 may be located a distance of 0.1 mm to 10 mm from the first periphery 1302. The distance may be decreased with a decrease in the thickness of the bezel.

The pressure sensor 118 may be located between the first surface and the second surface and may detect pressure exerted on the touch screen display 104 by an external object. The wireless communication circuit may be located inside the housing. The processor may be electrically coupled to the touch screen display 104, the pressure sensor 118, and the wireless communication circuit. The memory may be electrically coupled to the processor and may store instructions.

Referring to FIG. 14, the instructions stored in the memory, when executed, may cause the processor to display a user interface including a keypad on the touch screen display 104. The keypad may be located a predetermined distance from the first side 1304. The keypad may also be located in proximity to the first side 1304. The instructions may cause the processor to detect pressure applied to a selected area on the keypad, by using the pressure sensor 118. Furthermore, the instructions may cause the processor to display a key (or a button) that is not part of the keypad, in the selected area on the touch screen display 104 based on at least part of the detected pressure. Also, the instructions may cause the processor to display a space key or at least some of character keys as part of the keypad in the selected area. In FIG. 14, the processor may output the keypad together with a home key 1402, a menu key 1404, and a back key 1406 through the screen.

In an embodiment, the key (or the button) may have a length vertically extending from the first periphery 1302, and the length may be longer than 0.1 mm to 10 mm Referring to FIG. 14, the home key 1402, the menu key 1404, and the back key 1406 may extend in the horizontal or vertical direction and may have a length of 10 mm or more.

The instructions may cause the processor to execute a function associated with the key (or the button), based on at least part of the detected pressure. In an embodiment, the key may be implemented with the home key 1402, and the function may be a function of showing the home screen containing a plurality of application icons in a matrix pattern.

The instructions may cause the processor to display the keypad while moving the keypad away from the first periphery 1302 of the first surface. Referring to FIG. 15, the processor may move the keypad away from the first periphery 1302. Furthermore, the processor may display the keypad and the keys 1402, 1404, and 1406 on the screen by moving the keypad away from the first periphery 1302. In FIG. 15, the key may include one or more of the home key 1402, the menu key 1404, and the back key 1406.

In an embodiment, when a predetermined pressure or higher is applied, the processor may move the keypad away from the first periphery 1302. When the keypad is spaced away from the first periphery 1302, the keys 1402, 1404, and 1406 and the keypad may be simultaneously displayed on the screen. In another embodiment, when a predetermined pressure or higher is applied, the processor may locate the keys 1402, 1404, and 1406 on the keypad and may locate the keypad in proximity to the first periphery.

Figure 16:
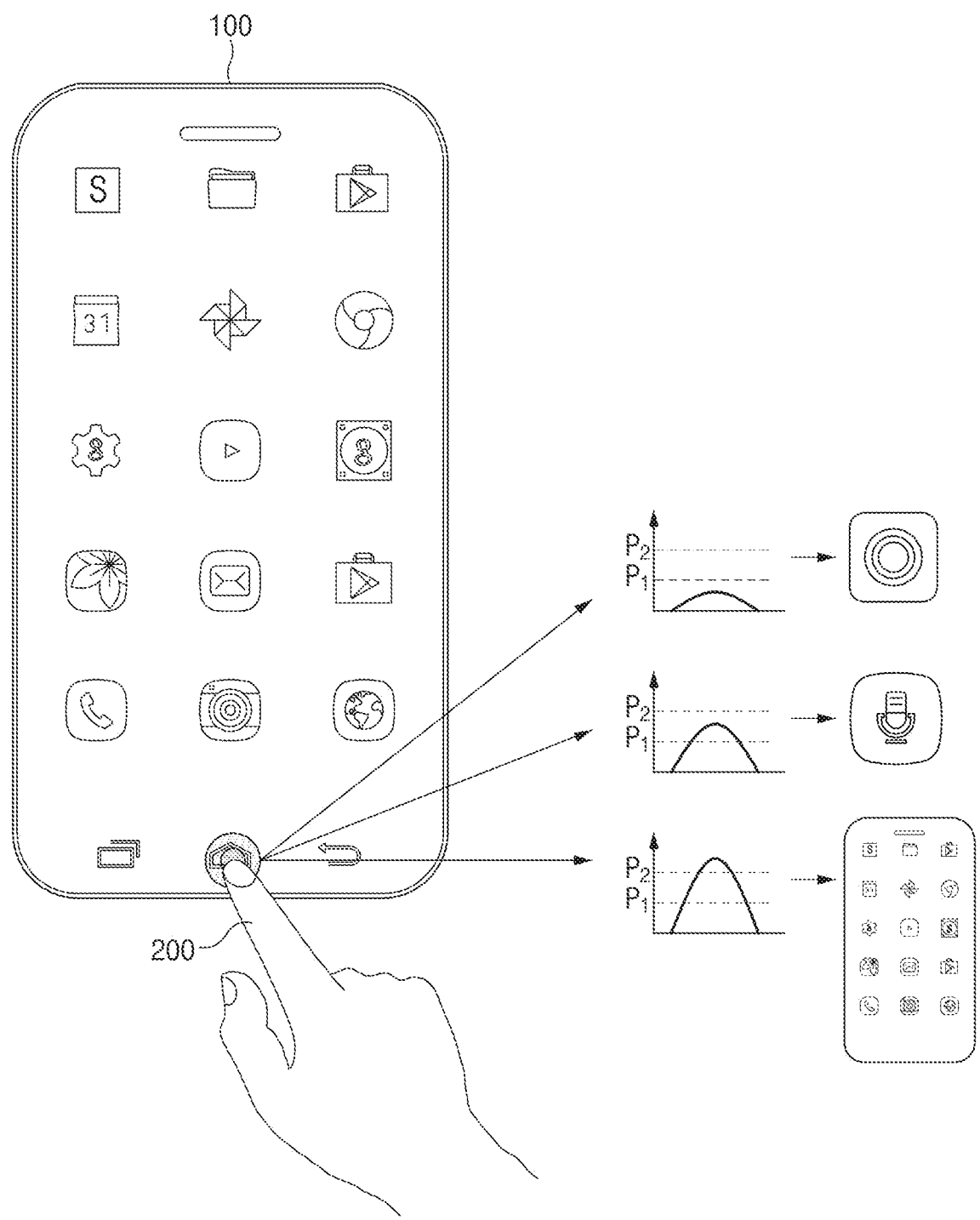
FIG. 16 is a view illustrating the electronic device that operates according to pressure applied to a home key, according to an embodiment.

FIG. 16 is a view illustrating the electronic device that operates according to pressure applied to the home key, according to an embodiment.

Referring to FIG. 16, when the external object 200 makes contact with the home key, the processor may compare the intensity of pressure applied to the home key with the first pressure value. When the intensity of the pressure is less than the first pressure value, the processor may operate a camera function. According to an embodiment of the present disclosure, the camera function may be executed by touching the home key only once.

When the intensity of the pressure applied to the home key is greater than or equal to the first pressure value and less than the second pressure value, the processor may execute a voice recording function. When the intensity of the pressure applied to the home key is greater than or equal to the second pressure value, the processor may execute the home key function. The embodiment illustrated in FIG. 16 is merely illustrative, and the home key function may also be executed when the intensity of the pressure is less than the first pressure value. Furthermore, the camera function may also be executed when the intensity of the pressure is greater than or equal to the second pressure value.

Figure 17:
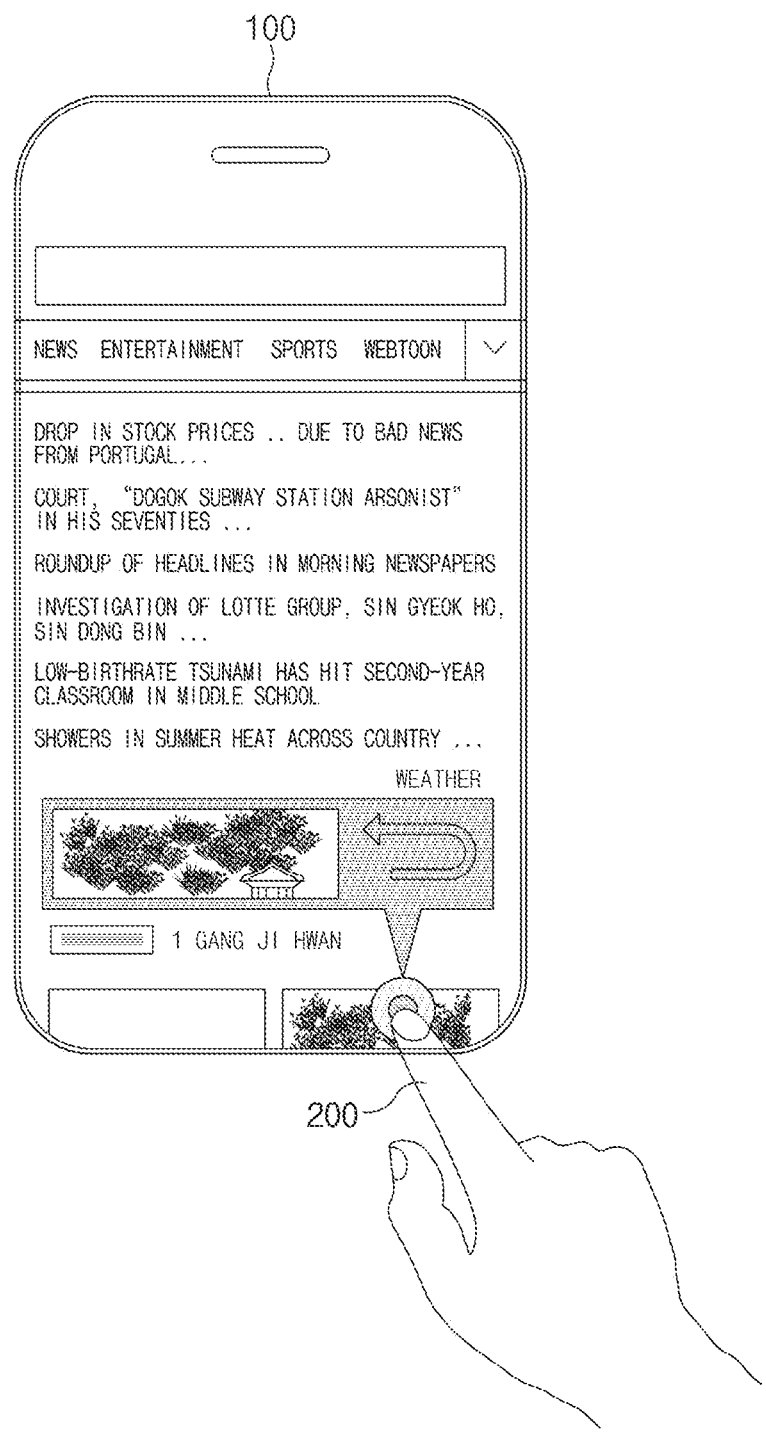
FIG. 17 is a view illustrating an operation of the electronic device in a case where a soft key area and a browser overlap each other, according to an embodiment.

FIG. 17 is a view illustrating an operation of the electronic device in a case where a soft key area and a browser overlap each other, according to an embodiment.

Referring to FIG. 17, when the external object 200 makes contact with the soft key area while the browser is being executed, the processor may execute the browser or a soft key according to the intensity of pressure applied to the soft key area. For example, the processor may execute the current browser when the intensity of the pressure is less than the first pressure value, and may execute the back key to output the previous internet search window when the intensity of the pressure is greater than or equal to the first pressure value. In contrast, the processor may execute the back key to output the previous internet search window when the intensity of the pressure is less than the first pressure value, and may execute the current browser when the intensity of the pressure is greater than or equal to the first pressure value.

Furthermore, when the external object 200 makes contact with the soft key area while the browser is being executed, the processor may output a selection window to allow a user to select any one of the browser and the soft key. The soft key may be enlarged and output in the selection window to enable the user to easily make a selection.

Figure 18:
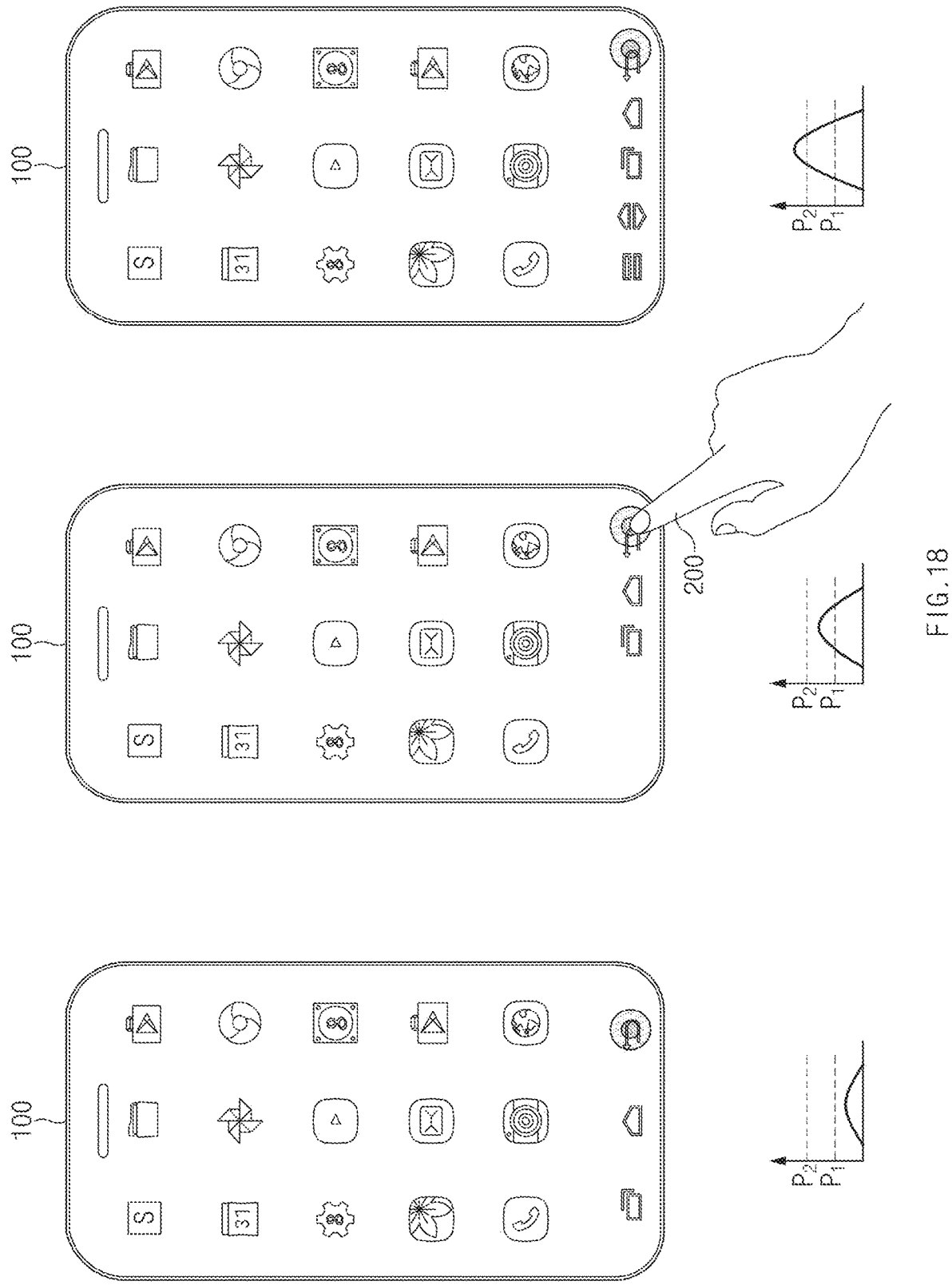
FIG. 18 is a view illustrating the electronic device that operates according to pressure applied to the soft key area, according to an embodiment.

FIG. 18 is a view illustrating the electronic device that operates according to pressure applied to the soft key area, according to an embodiment.

Referring to FIG. 18, the configuration of the soft key area may vary according to the intensity of the pressure applied to the soft key area. For example, when the intensity of the pressure is less than the first pressure value, a soft key may be executed. When the intensity of the pressure is greater than or equal to the first pressure value and less than the second pressure value, the menu key and the home key may be moved toward the back key. When the intensity of the pressure is greater than or equal to the second pressure value, other soft keys may be displayed in addition to the menu key, the home key, and the back key.

The embodiment illustrated in FIG. 18 is merely illustrative, and the other soft keys may also be displayed when the intensity of the pressure is less than the first pressure value. Furthermore, when the intensity of the pressure is greater than or equal to the first pressure value and less than the second pressure value, a soft key may be executed.

Figure 19:
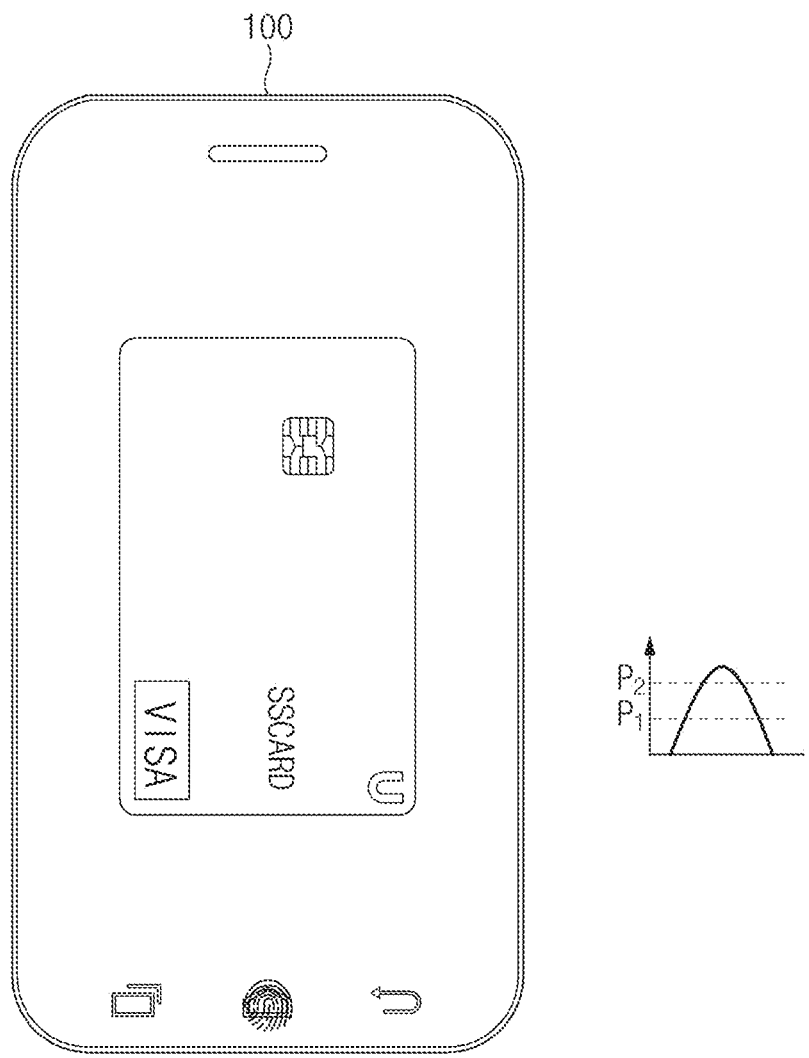
FIG. 19 is a view illustrating the electronic device in which the home key, the pressure sensor, and the fingerprint sensor operate in a combined state, according to an embodiment.

FIG. 19 is a view illustrating the electronic device in which the home key, the pressure sensor, and the fingerprint sensor operate in a combined state, according to an embodiment.

Referring to FIG. 19, when a predetermined pressure or higher is applied to the home key, the fingerprint sensor may operate. When the fingerprint sensor operates, fingerprint information may be input to the electronic device. When the fingerprint information input to the electronic device agrees with fingerprint information stored in the memory, payment may be made through the electronic device. Furthermore, when the predetermined pressure or higher is applied to the home key, credit card information may be output through the touch screen display.

The embodiment illustrated in FIG. 19 is merely illustrative, and the fingerprint sensor may also operate when the intensity of the pressure is less than the first pressure value. Furthermore, when the intensity of the pressure is greater than or equal to the first pressure value and less than the second pressure value, payment may be made.

Figure 20:
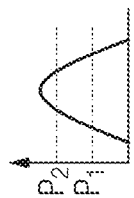
FIG. 20 is a view illustrating the electronic device that operates according to pressure applied to a soft key in a screen-locked state, according to an embodiment.
Figure 20:
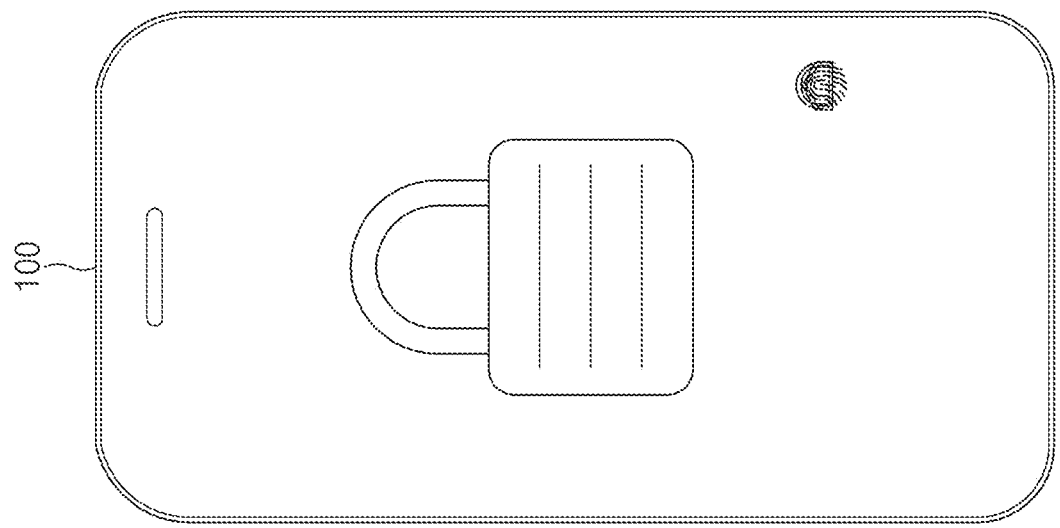
Figure 20:
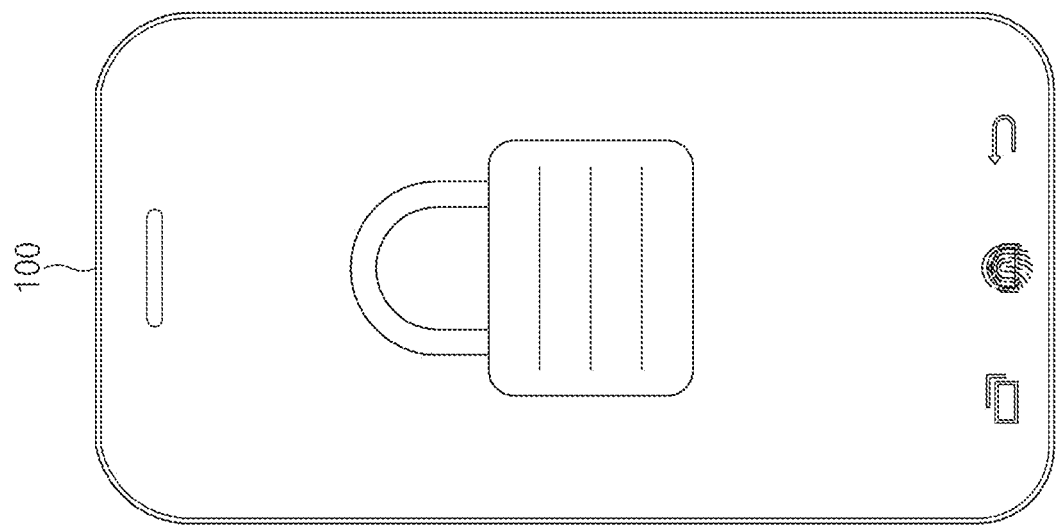
Figure 20:
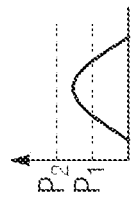

FIG. 20 is a view illustrating the electronic device that operates according to pressure applied to a soft key in a screen-locked state, according to an embodiment.

Referring to FIG. 20, the fingerprint sensor may operate when the intensity of pressure applied to the home key in the screen-locked state is greater than or equal to the first pressure value. When the fingerprint sensor operates, fingerprint information may be input to the electronic device. When the fingerprint information input through the fingerprint sensor agrees with fingerprint information stored in the memory, the screen-locked state may be released, and the home screen may be output.

In an embodiment, the soft key area may be modified when the intensity of the pressure applied to the home key in the screen-locked state is greater than or equal to the second pressure value. According to an embodiment of the present disclosure, the electronic device may be configured according to user convenience by modifying the soft key area.

Figure 21:
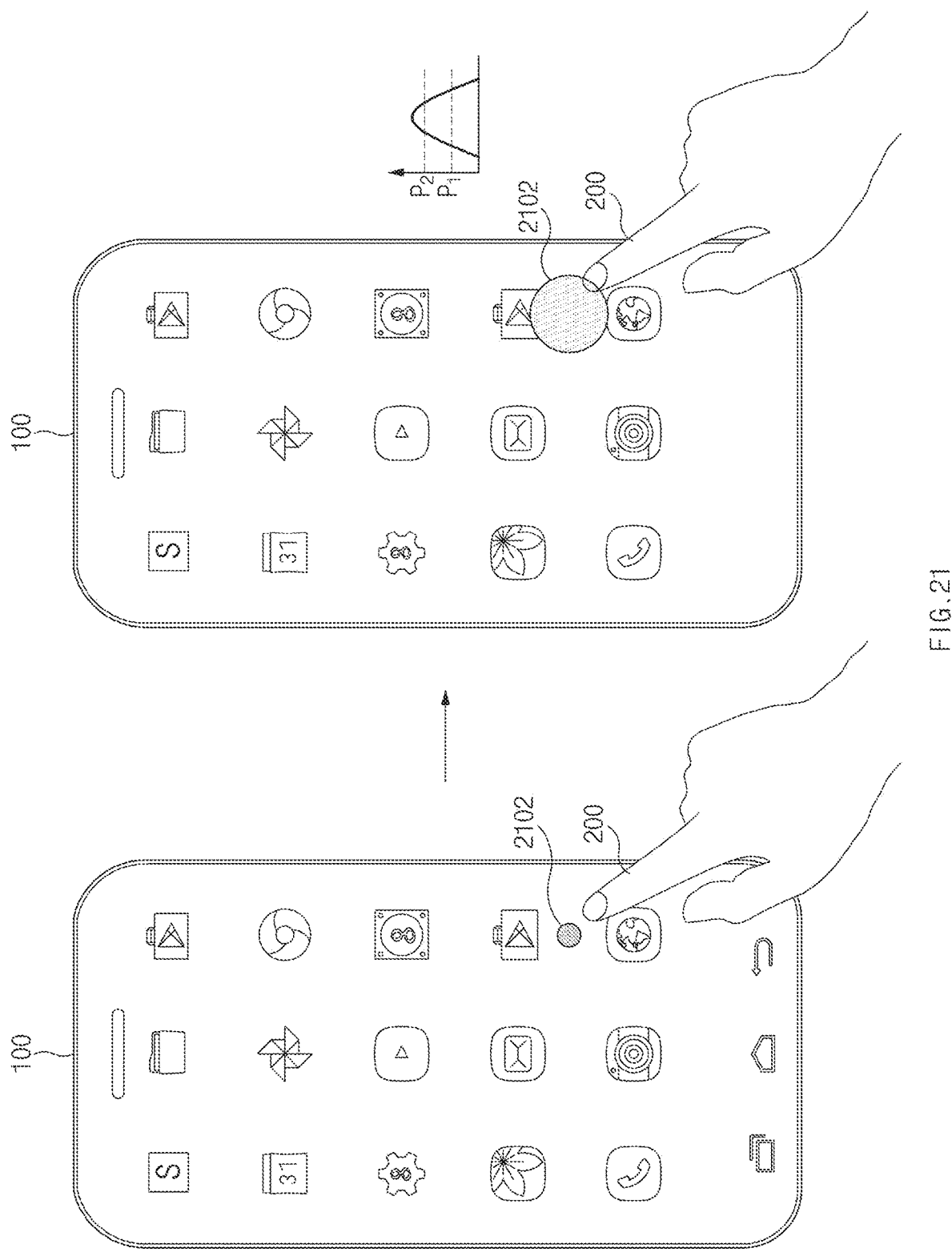
FIG. 21 is a view illustrating a soft key enlarged by a touch of an external object, according to an embodiment.

FIG. 21 is a view illustrating a soft key enlarged by a touch of an external object, according to an embodiment.

Referring to FIG. 21, a soft key 2102 may not appear on the touch screen display 104, or may be small in size, before the external object 200 touches the touch screen display 104. Furthermore, the position of the soft key 2102 may not be determined before the external object 200 touches the touch screen display 104.

However, when the external object 200 touches the touch screen display 104, the soft key 2102 may be enlarged and output on the touch screen display 104. Furthermore, the soft key 2102 may be displaced to the portion where the external object 200 touches the touch screen display 104. In an embodiment, when the external object 200 exerts a pressure of more than the second pressure value on the touch screen display 104, the soft key 2102 may be enlarged and output on the touch screen display 104.

Figure 22:
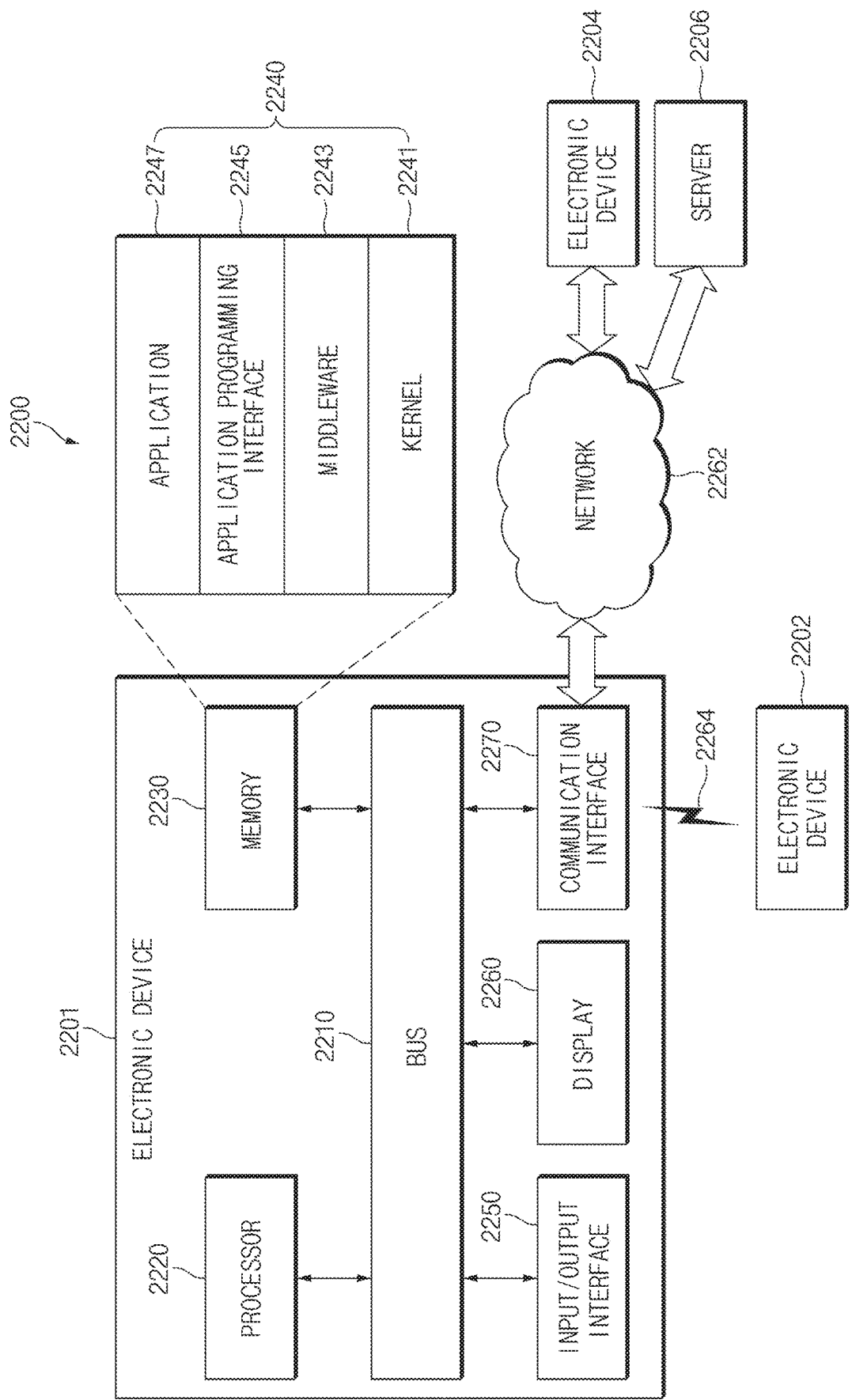
FIG. 22 is a view illustrating an electronic device in a network environment system according to various embodiments.

FIG. 22 illustrates an electronic device in a network environment system, according to various embodiments.

Referring to FIG. 22, according to various embodiments, an electronic device 2201, a first electronic device 2202, a second electronic device 2204, or a server 2206 may be connected each other over a network 2262 or a short range communication 2264. The electronic device 2201 may include a bus 2210, a processor 2220, a memory 2230, an input/output interface 2250, a display 2260, and a communication interface 2270. According to an embodiment, the electronic device 2201 may not include at least one of the above-described components or may further include other component(s).

For example, the bus 2210 may interconnect the above-described components 2210 to 2270 and may include a circuit for conveying communications (e.g., a control message and/or data) among the above-described components.

The processor 2220 may include one or more of a central processing unit (CPU), an application processor (AP), or a communication processor (CP). For example, the processor 2220 may perform an arithmetic operation or data processing associated with control and/or communication of at least other components of the electronic device 2201.

The memory 2230 may include a volatile and/or nonvolatile memory. For example, the memory 2230 may store commands or data associated with at least one other component(s) of the electronic device 2201. According to an embodiment, the memory 2230 may store software and/or a program 2240. The program 2240 may include, for example, a kernel 2241, a middleware 2243, an application programming interface (API) 2245, and/or an application program (or "an application") 2247. At least a part of the kernel 2241, the middleware 2243, or the API 2245 may be referred to as an "operating system (OS)".

For example, the kernel 2241 may control or manage system resources (e.g., the bus 2210, the processor 2220, the memory 2230, and the like) that are used to execute operations or functions of other programs (e.g., the middleware 2243, the API 2245, and the application program 2247). Furthermore, the kernel 2241 may provide an interface that allows the middleware 2243, the API 2245, or the application program 2247 to access discrete components of the electronic device 2201 so as to control or manage system resources.

The middleware 2243 may perform, for example, a mediation role such that the API 2245 or the application program 2247 communicates with the kernel 2241 to exchange data.

Furthermore, the middleware 2243 may process task requests received from the application program 2247 according to a priority. For example, the middleware 2243 may assign the priority, which makes it possible to use a system resource (e.g., the bus 2210, the processor 2220, the memory 2230, or the like) of the electronic device 2201, to at least one of the application program 2247. For example, the middleware 2243 may process the one or more task requests according to the priority assigned to the at least one, which makes it possible to perform scheduling or load balancing on the one or more task requests.

The API 2245 may be, for example, an interface through which the application program 2247 controls a function provided by the kernel 2241 or the middleware 2243, and may include, for example, at least one interface or function (e.g., an instruction) for a file control, a window control, image processing, a character control, or the like.

The input/output interface 2250 may play a role, for example, of an interface which transmits a command or data input from a user or another external device, to other component(s) of the electronic device 2201. Furthermore, the input/output interface 2250 may output a command or data, received from other component(s) of the electronic device 2201, to a user or another external device.

The display 2260 may include, for example, a liquid crystal display (LCD), a light-emitting diode (LED) display, an organic LED (OLED) display, a microelectromechanical systems (MEMS) display, or an electronic paper display. The display 2260 may display, for example, various contents (e.g., a text, an image, a video, an icon, a symbol, and the like) to a user. The display 2260 may include a touch screen and may receive, for example, a touch, gesture, proximity, or hovering input using an electronic pen or a part of a user's body.

For example, the communication interface 2270 may establish communication between the electronic device 2201 and an external device (e.g., the first electronic device 2202, the second electronic device 2204, or the server 2206). For example, the communication interface 2270 may be connected to the network 2262 over wireless communication or wired communication to communicate with the external device (e.g., the second electronic device 2204 or the server 2206).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 2264. The short range communication 2264 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 2201 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the present disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 2262 may include at least one of telecommunications networks, for example, a computer network (e.g., LAN or WAN), an Internet, or a telephone network.

Each of the first and second electronic devices 2202 and 2204 may be a device of which the type is different from or the same as that of the electronic device 2201. According to an embodiment, the server 2206 may include a group of one or more servers. According to various embodiments, all or a portion of operations that the electronic device 2201 will perform may be executed by another or plural electronic devices (e.g., the first electronic device 2202, the second electronic device 2204 or the server 2206). According to an embodiment, in the case where the electronic device 2201 executes any function or service automatically or in response to a request, the electronic device 2201 may not perform the function or the service internally, but, alternatively additionally, it may request at least a portion of a function associated with the electronic device 2201 from another device (e.g., the electronic device 2202 or 2204 or the server 2206). The other electronic device may execute the requested function or additional function and may transmit the execution result to the electronic device 2201. The electronic device 2201 may provide the requested function or service using the received result or may additionally process the received result to provide the requested function or service. To this end, for example, cloud computing, distributed computing, or client-server computing may be used.

Figure 23:
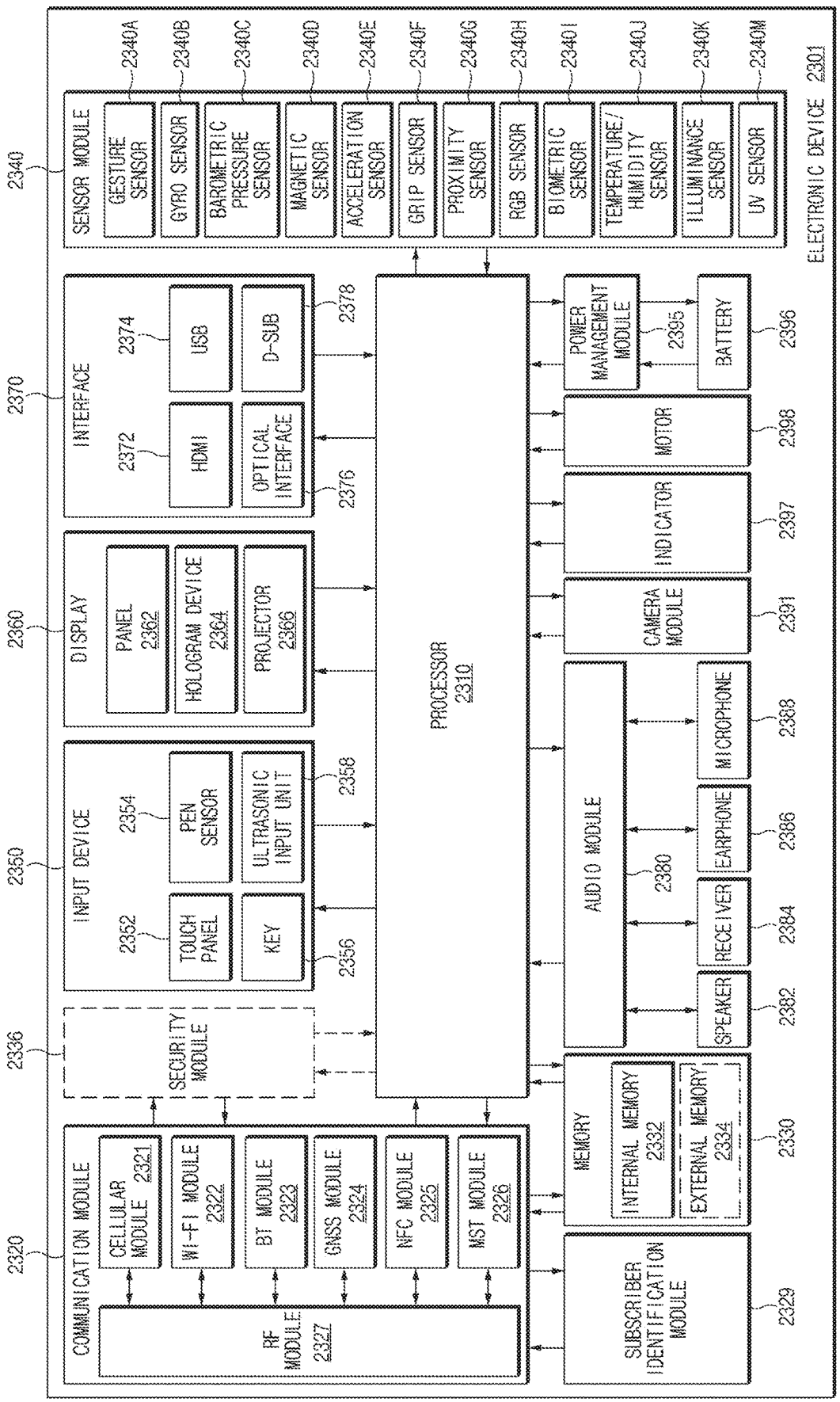
FIG. 23 is a block diagram illustrating an electronic device according to various embodiments.

FIG. 23 illustrates a block diagram of an electronic device, according to various embodiments.

Referring to FIG. 23, an electronic device 2301 may include, for example, all or a part of the electronic device 2201 illustrated in FIG. 22. The electronic device 2301 may include one or more processors (e.g., an application processor (AP)) 2310, a communication module 2320, a subscriber identification module 2329, a memory 2330, a sensor module 2340, an input device 2350, a display 2360, an interface 2370, an audio module 2380, a camera module 2391, a power management module 2395, a battery 2396, an indicator 2397, and a motor 2398.

The processor 2310 may drive, for example, an operating system (OS) or an application to control a plurality of hardware or software components connected to the processor 2310 and may process and compute a variety of data. For example, the processor 2310 may be implemented with a System on Chip (SoC). According to an embodiment, the processor 2310 may further include a graphic processing unit (GPU) and/or an image signal processor. The processor 2310 may include at least a part (e.g., a cellular module 2321) of components illustrated in FIG. 23. The processor 2310 may load a command or data, which is received from at least one of other components (e.g., a nonvolatile memory), into a volatile memory and process the loaded command or data. The processor 2310 may store a variety of data in the nonvolatile memory.

The communication module 2320 may be configured the same as or similar to the communication interface 2270 of FIG. 22. The communication module 2320 may include the cellular module 2321, a Wi-Fi module 2322, a Bluetooth (BT) module 2323, a GNSS module 2324 (e.g., a GPS module, a Glonass module, a Beidou module, or a Galileo module), a near field communication (NFC) module 2325, a MST module 2326 and a radio frequency (RF) module 2327.

The cellular module 2321 may provide, for example, voice communication, video communication, a character service, an Internet service, or the like over a communication network. According to an embodiment, the cellular module 2321 may perform discrimination and authentication of the electronic device 2301 within a communication network by using the subscriber identification module (e.g., a SIM card) 2329. According to an embodiment, the cellular module 2321 may perform at least a portion of functions that the processor 2310 provides. According to an embodiment, the cellular module 2321 may include a communication processor (CP).

Each of the Wi-Fi module 2322, the BT module 2323, the GNSS module 2324, the NFC module 2325, or the MST module 2326 may include a processor for processing data exchanged through a corresponding module, for example. According to an embodiment, at least a part (e.g., two or more) of the cellular module 2321, the Wi-Fi module 2322, the BT module 2323, the GNSS module 2324, the NFC module 2325, or the MST module 2326 may be included within one Integrated Circuit (IC) or an IC package.

For example, the RF module 2327 may transmit and receive a communication signal (e.g., an RF signal). For example, the RF module 2327 may include a transceiver, a power amplifier module (PAM), a frequency filter, a low noise amplifier (LNA), an antenna, or the like. According to another embodiment, at least one of the cellular module 2321, the Wi-Fi module 2322, the BT module 2323, the GNSS module 2324, the NFC module 2325, or the MST module 2326 may transmit and receive an RF signal through a separate RF module.

The subscriber identification module 2329 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 2330 (e.g., the memory 2230) may include an internal memory 2332 or an external memory 2334. For example, the internal memory 2332 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 2334 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 2334 may be operatively and/or physically connected to the electronic device 2301 through various interfaces.

A security module 2336 may be a module that includes a storage space of which a security level is higher than that of the memory 2330 and may be a circuit that guarantees safe data storage and a protected execution environment. The security module 2336 may be implemented with a separate circuit and may include a separate processor. For example, the security module 2336 may be in a smart chip or a secure digital (SD) card, which is removable, or may include an embedded secure element (eSE) embedded in a fixed chip of the electronic device 2301. Furthermore, the security module 2336 may operate based on an operating system (OS) that is different from the OS of the electronic device 2301. For example, the security module 2336 may operate based on java card open platform (JCOP) OS.

The sensor module 2340 may measure, for example, a physical quantity or may detect an operation state of the electronic device 2301. The sensor module 2340 may convert the measured or detected information to an electric signal. For example, the sensor module 2340 may include at least one of a gesture sensor 2340A, a gyro sensor 2340B, a barometric pressure sensor 2340C, a magnetic sensor 2340D, an acceleration sensor 2340E, a grip sensor 2340F, the proximity sensor 2340G, a color sensor 2340H (e.g., red, green, blue (RGB) sensor), a biometric sensor 2340I, a temperature/humidity sensor 2340J, an illuminance sensor 2340K, or an UV sensor 2340M. Although not illustrated, additionally or alternatively, the sensor module 2340 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2340 may further include a control circuit for controlling at least one or more sensors included therein. According to an embodiment, the electronic device 2301 may further include a processor that is a part of the processor 2310 or independent of the processor 2310 and is configured to control the sensor module 2340. The processor may control the sensor module 2340 while the processor 2310 remains at a sleep state.

The input device 2350 may include, for example, a touch panel 2352, a (digital) pen sensor 2354, a key 2356, or an ultrasonic input unit 2358. For example, the touch panel 2352 may use at least one of capacitive, resistive, infrared and ultrasonic detecting methods. Also, the touch panel 2352 may further include a control circuit. The touch panel 2352 may further include a tactile layer to provide a tactile reaction to a user.

The (digital) pen sensor 2354 may be, for example, a part of a touch panel or may include an additional sheet for recognition. The key 2356 may include, for example, a physical button, an optical key, a keypad, or the like. The ultrasonic input device 2358 may detect (or sense) an ultrasonic signal, which is generated from an input device, through a microphone (e.g., a microphone 2388) and may check data corresponding to the detected ultrasonic signal.

The display 2360 (e.g., the display 2260) may include a panel 2362, a hologram device 2364, or a projector 2366. The panel 2362 may be the same as or similar to the display 2260 illustrated in FIG. 22. The panel 2362 may be implemented, for example, to be flexible, transparent or wearable. The panel 2362 and the touch panel 2352 may be integrated into a single module. The hologram device 2364 may display a stereoscopic image in a space using a light interference phenomenon. The projector 2366 may project light onto a screen so as to display an image. For example, the screen may be arranged in the inside or the outside of the electronic device 2301. According to an embodiment, the display 2360 may further include a control circuit for controlling the panel 2362, the hologram device 2364, or the projector 2366.

The interface 2370 may include, for example, a high-definition multimedia interface (HDMI) 2372, a universal serial bus (USB) 2374, an optical interface 2376, or a D-subminiature (D-sub) 2378. The interface 2370 may be included, for example, in the communication interface 2270 illustrated in FIG. 22. Additionally or alternatively, the interface 2370 may include, for example, a mobile high definition link (MHL) interface, a SD card/multi-media card (MMC) interface, or an infrared data association (IrDA) standard interface.

The audio module 2380 may convert a sound and an electric signal in dual directions. At least a component of the audio module 2380 may be included, for example, in the input/output interface 2250 illustrated in FIG. 22. The audio module 2380 may process, for example, sound information that is input or output through a speaker 2382, a receiver 2384, an earphone 2386, or the microphone 2388.

For example, the camera module 2391 may shoot a still image or a video. According to an embodiment, the camera module 2391 may include at least one or more image sensors (e.g., a front sensor or a rear sensor), a lens, an image signal processor (ISP), or a flash (e.g., an LED or a xenon lamp).

The power management module 2395 may manage, for example, power of the electronic device 2301. According to an embodiment, a power management integrated circuit (PMIC), a charger IC, or a battery or fuel gauge may be included in the power management module 2395. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 2396 and a voltage, current or temperature thereof while the battery is charged. The battery 2396 may include, for example, a rechargeable battery and/or a solar battery.

The indicator 2397 may display a specific state of the electronic device 2301 or a part thereof (e.g., the processor 2310), such as a booting state, a message state, a charging state, and the like. The motor 2398 may convert an electrical signal into a mechanical vibration and may generate the following effects: vibration, haptic, and the like. Although not illustrated, a processing device (e.g., a GPU) for supporting a mobile TV may be included in the electronic device 2301. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the present disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 24:
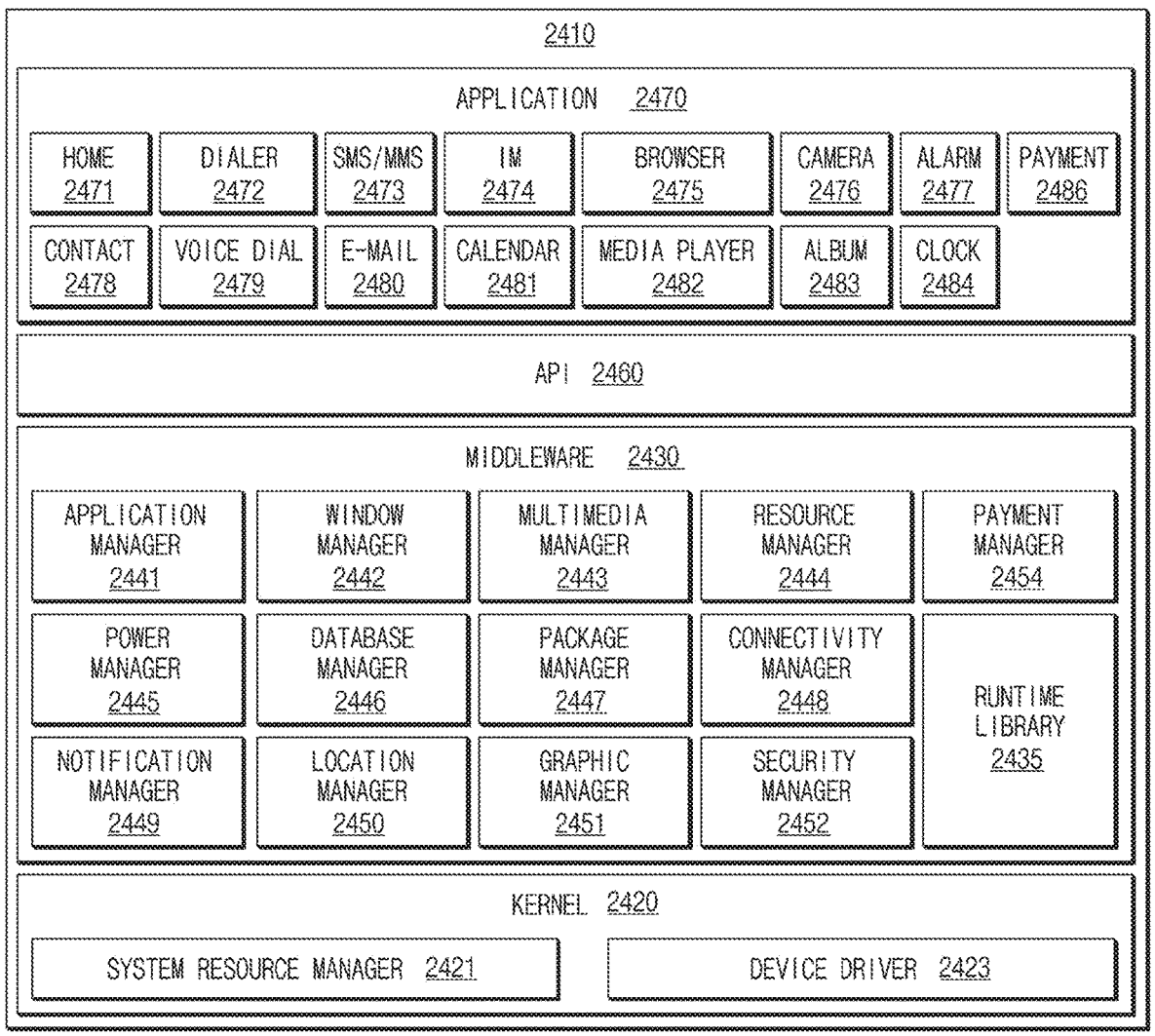
FIG. 24 is a block diagram illustrating a program module according to various embodiments.

FIG. 24 illustrates a block diagram of a program module, according to various embodiments.

According to an embodiment, a program module 2410 (e.g., the program 2240) may include an operating system (OS) to control resources associated with an electronic device (e.g., the electronic device 2201), and/or diverse applications (e.g., the application program 2247) driven on the OS. The OS may be, for example, Android™ iOS™, Windows™, Symbian™, or Tizen™.

The program module 2410 may include a kernel 2420, a middleware 2430, an application programming interface (API) 2460, and/or an application 2470. At least a portion of the program module 2410 may be preloaded on an electronic device or may be downloadable from an external electronic device (e.g., the first electronic device 2202, the second electronic device 2204, the server 2206, or the like).

The kernel 2420 (e.g., the kernel 2241) may include, for example, a system resource manager 2421 or a device driver 2423. The system resource manager 2421 may perform control, allocation, or retrieval of system resources. According to an embodiment, the system resource manager 2421 may include a process managing unit, a memory managing unit, or a file system managing unit. The device driver 2423 may include, for example, a display driver, a camera driver, a Bluetooth driver, a shared memory driver, a USB driver, a keypad driver, a Wi-Fi driver, an audio driver, or an inter-process communication (IPC) driver.

The middleware 2430 may provide, for example, a function that the application 2470 needs in common, or may provide diverse functions to the application 2470 through the API 2460 to allow the application 2470 to efficiently use limited system resources of the electronic device. According to an embodiment, the middleware 2430 (e.g., the middleware 2243) may include at least one of a runtime library 2435, an application manager 2441, a window manager 2442, a multimedia manager 2443, a resource manager 2444, a power manager 2445, a database manager 2446, a package manager 2447, a connectivity manager 2448, a notification manager 2449, a location manager 2450, a graphic manager 2451, a security manager 2452, or a payment manager 2454.

The runtime library 2435 may include, for example, a library module that is used by a compiler to add a new function through a programming language while the application 2470 is being executed. The runtime library 2435 may perform input/output management, memory management, or capacities about arithmetic functions.

The application manager 2441 may manage, for example, a life cycle of at least one application of the application 2470. The window manager 2442 may manage a graphic user interface (GUI) resource that is used in a screen. The multimedia manager 2443 may identify a format necessary for playing diverse media files, and may perform encoding or decoding of media files by using a codec suitable for the format. The resource manager 2444 may manage resources such as a storage space, memory, or source code of at least one application of the application 2470.

The power manager 2445 may operate, for example, with a basic input/output system (BIOS) to manage a battery or power, and may provide power information for an operation of an electronic device. The database manager 2446 may generate, search for, or modify database that is to be used in at least one application of the application 2470. The package manager 2447 may install or update an application that is distributed in the form of package file.

The connectivity manager 2448 may manage, for example, wireless connection such as Wi-Fi or Bluetooth. The notification manager 2449 may display or notify an event such as arrival message, appointment, or proximity notification in a mode that does not disturb a user. The location manager 2450 may manage location information about an electronic device. The graphic manager 2451 may manage a graphic effect that is provided to a user, or manage a user interface relevant thereto. The security manager 2452 may provide a general security function necessary for system security, user authentication, or the like. According to an embodiment, in the case where an electronic device (e.g., the electronic device 2201) includes a telephony function, the middleware 2430 may further include a telephony manager for managing a voice or video call function of the electronic device.

The middleware 2430 may include a middleware module that combines diverse functions of the above-described components. The middleware 2430 may provide a module specialized to each OS kind to provide differentiated functions. Additionally, the middleware 2430 may dynamically remove a part of the preexisting components or may add new components thereto.

The API 2460 (e.g., the API 2245) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 2470 (e.g., the application program 2247) may include, for example, one or more applications capable of providing functions for a home 2471, a dialer 2472, an SMS/MMS 2473, an instant message (IM) 2474, a browser 2475, a camera 2476, an alarm 2477, a contact 2478, a voice dial 2479, an e-mail 2480, a calendar 2481, a media player 2482, an album 2483, or a timepiece 2484 or for offering health care (e.g., measuring an exercise quantity, blood sugar, or the like) or environment information (e.g., information of barometric pressure, humidity, temperature, or the like).

According to an embodiment, the application 2470 may include an application (hereinafter referred to as "information exchanging application" for descriptive convenience) to support information exchange between an electronic device (e.g., the electronic device 2201) and an external electronic device (e.g., the first electronic device 2202 or the second electronic device 2204). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 2470 may include an application (e.g., a health care application of a mobile medical device) that is assigned in accordance with an attribute of an external electronic device. According to an embodiment, the application 2470 may include an application that is received from an external electronic device (e.g., the first electronic device 2202, the second electronic device 2204, or the server 2206). According to an embodiment, the application 2470 may include a preloaded application or a third party application that is downloadable from a server. The names of components of the program module 2410 according to the embodiment may be modifiable depending on kinds of operating systems.

According to various embodiments, at least a portion of the program module 2410 may be implemented by software, firmware, hardware, or a combination of two or more thereof. At least a portion of the program module 2410 may be implemented (e.g., executed), for example, by the processor (e.g., the processor 2310). At least a portion of the program module 2410 may include, for example, modules, programs, routines, sets of instructions, processes, or the like for performing one or more functions.

The term "module" used in the present disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 2220), may cause the one or more processors to perform a function corresponding to the instruction. The computer-readable storage media, for example, may be the memory 2230.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
a printed circuit board;
a bracket disposed over the printed circuit board;
a pressure sensor electrically coupled to the printed circuit board and disposed in a partial area of the bracket;
a touch screen display electrically coupled to the printed circuit board and disposed over the bracket;
a cover glass disposed over the touch screen display;
a touch sensor disposed between the cover glass and the touch screen display and configured to detect whether an external object present outside the electronic device makes contact with the cover glass; and
a fingerprint sensor configured to detect a fingerprint of the external object,
wherein the pressure sensor includes a hole having a shape corresponding to the fingerprint sensor to accommodate the fingerprint sensor.

2. The electronic device of claim 1, wherein the fingerprint sensor is disposed between the cover glass and the touch sensor to detect the fingerprint of the external object, based on a capacitance change of an area where the external object makes contact with the cover glass.

3. The electronic device of claim 1, wherein the fingerprint sensor is disposed below the pressure sensor, and the hole of the pressure sensor is located in a center of the pressure sensor.

4. The electronic device of claim 3, wherein the fingerprint sensor detects the fingerprint of the external object by transmitting ultrasonic waves or light to the cover glass through the hole and receiving ultrasonic waves or light reflected from an area where the external object makes contact with the cover glass, through the hole.

5. The electronic device of claim 1, wherein the fingerprint sensor includes:
an insulator including a first surface facing a first direction and a second surface facing a second direction that is opposite to the first direction;
one or more first electrodes arranged on the first surface in a horizontal or vertical direction; and
a second electrode disposed on the second surface.

6. The electronic device of claim 1, wherein the fingerprint sensor includes:
an insulator including a first surface facing a first direction and a second surface facing a second direction that is opposite to the first direction;
one or more first electrodes arranged on the first surface in a horizontal direction; and
one or more second electrodes arranged on the second surface in a vertical direction.

7. The electronic device of claim 1, wherein the pressure sensor includes:
a first electrode;
a dielectric disposed below the first electrode; and
a second electrode disposed below the dielectric, and
wherein the pressure sensor detects intensity of pressure applied to the cover glass, based on a capacitance change between the first electrode and the second electrode.

8. The electronic device of claim 7, wherein the dielectric is an air gap between the first electrode and the second electrode, and
wherein the second electrode is the bracket.

* * * * *